United States Patent
Maeto et al.

(10) Patent No.: US 10,650,860 B2
(45) Date of Patent: May 12, 2020

(54) MAGNETIC DISK DEVICE AND WRITE PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Nobuhiro Maeto, Tokyo (JP); Akihiko Takeo, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 16/275,967

(22) Filed: Feb. 14, 2019

(65) Prior Publication Data

US 2019/0378543 A1  Dec. 12, 2019

(30) Foreign Application Priority Data

Jun. 12, 2018 (JP) ................................ 2018-111882

(51) Int. Cl.
| | | |
|---|---|---|
| *G11B 11/08* | (2006.01) | |
| *G11B 21/08* | (2006.01) | |
| *G11B 5/127* | (2006.01) | |
| *G11B 21/10* | (2006.01) | |
| *G11B 5/596* | (2006.01) | |

(52) U.S. Cl.
CPC .............. *G11B 21/08* (2013.01); *G11B 5/127* (2013.01); *G11B 5/59627* (2013.01); *G11B 5/59694* (2013.01); *G11B 21/081* (2013.01); *G11B 21/083* (2013.01); *G11B 21/10* (2013.01)

(58) Field of Classification Search
None
See application file for complete search history.

(56) References Cited

U.S. PATENT DOCUMENTS

| | | | |
|---|---|---|---|
| 6,975,468 B1 | 12/2005 | Melrose et al. | |
| 9,064,526 B1 | 6/2015 | Kawabe et al. | |
| 9,099,155 B1* | 8/2015 | Kataria ................. | G11B 27/36 |
| 9,336,073 B1 | 5/2016 | Wiesen et al. | |
| 2006/0171265 A1* | 8/2006 | Fukui .................. | G11B 7/0948 369/44.28 |
| 2017/0178672 A1* | 6/2017 | Zhu .................... | G11B 5/59627 |

* cited by examiner

*Primary Examiner* — Tan X Dinh
(74) *Attorney, Agent, or Firm* — Kim & Stewart LLP

(57) ABSTRACT

According to one embodiment, a magnetic disk device includes a disk, a head for writing data to the disk and reading data from the disk, and a controller configured to detect a positioning error of the head as the head is writing the data in a first track of the disk, and change a first threshold value for interrupting the writing based on one or more evaluation values corresponding to a possibility of correcting error data in the first track of the disk. The controller interrupts the writing when detecting the positioning error of the head writing the first track that exceeds the first threshold value.

16 Claims, 12 Drawing Sheets

US 10,650,860 B2

MAGNETIC DISK DEVICE AND WRITE PROCESSING METHOD

CROSS-REFERENCE TO RELATED APPLICATION

This application is based upon and claims the benefit of priority from Japanese Patent Application No. 2018-111882, filed Jun. 12, 2018, the entire contents of which are incorporated herein by reference.

FIELD

Embodiments described herein relate generally to a magnetic disk device and a write processing method.

BACKGROUND

In recent years, various techniques for increasing recording capacity of a magnetic disk device have been developed. As one of these techniques, there is a recording technique called shingled write magnetic recording (SMR) or shingled write recording (SWR). When writing data to a magnetic disk, a shingled write type magnetic disk device writes the next recording track while overlapping a part of an adjacent track (hereinafter, referred to as adjacent track). In the shingled write type magnetic disk device, the width of overwritten tracks may be narrower than the width of tracks not overwritten.

DETAILED DESCRIPTION

Embodiments provide a magnetic disk device and a write processing method capable of improving the performance of write processing.

In general, according to one embodiment, a magnetic disk device comprises a disk, a head for writing data to the disk and reading data from the disk, and a controller configured to detect a positioning error of the head as the head is writing the data in a first track of the disk, and change a first threshold value for interrupting the writing based on one or more evaluation values corresponding to a possibility of correcting error data in the first track of the disk. The controller interrupts the writing when detecting the positioning error of the head writing the first track that exceeds the first threshold value.

Hereinafter, embodiments will be described with reference to drawings. The drawings are merely examples and do not limit the scope of the invention.

First Embodiment

Figure 1:
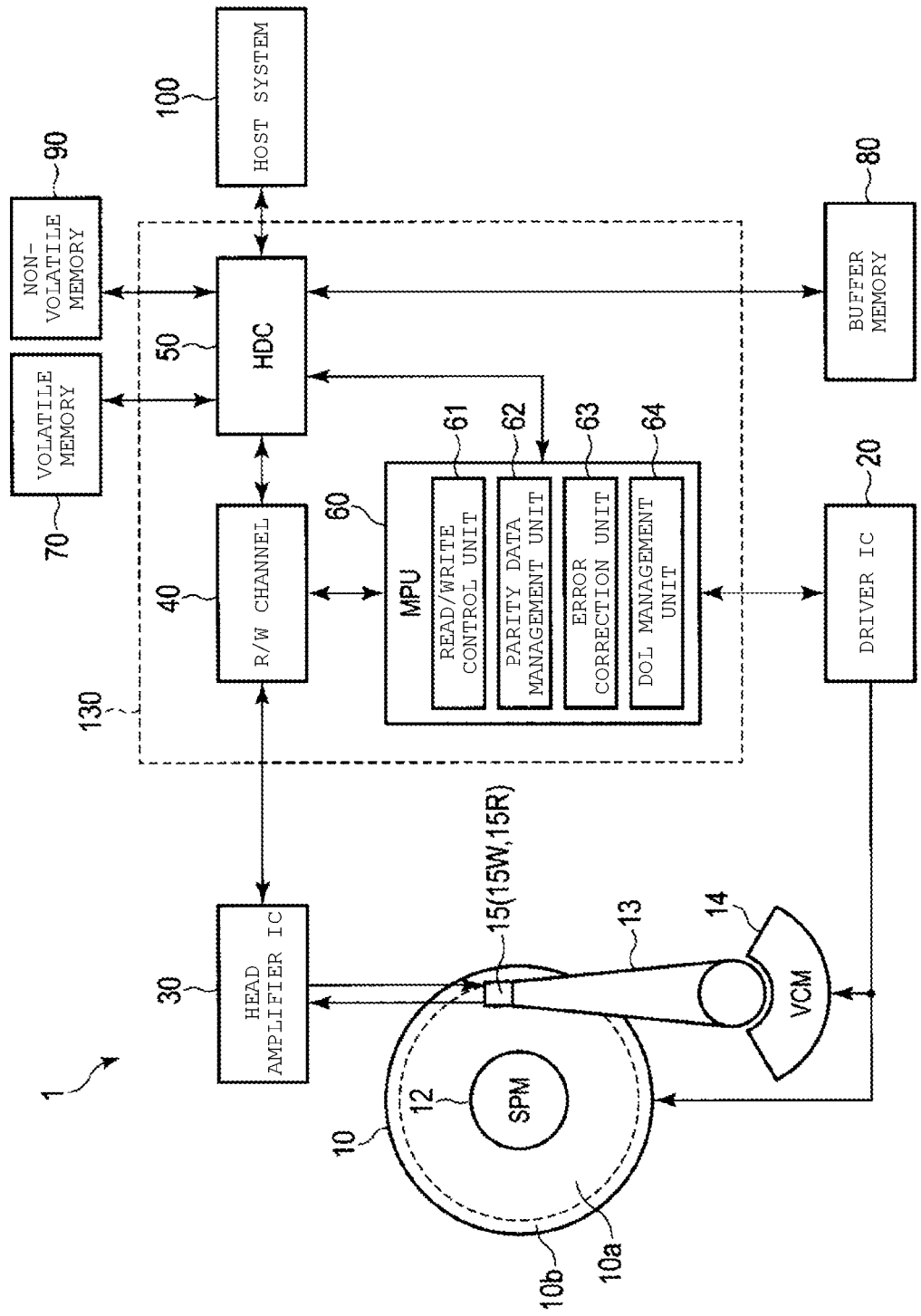
FIG. 1 is a block diagram of a magnetic disk device according to a first embodiment.

FIG. 1 is a block diagram showing a magnetic disk device 1 according to a first embodiment. The magnetic disk device 1 includes a head disk assembly (HDA), a driver IC 20, a head amplifier integrated circuit (also referred to as head amplifier IC or preamplifier) 30, a volatile memory 70, a buffer memory (also referred to as buffer) 80, a non-volatile memory 90, and a system controller 130 which is an integrated circuit of one chip, which will be described later. In addition, the magnetic disk device 1 is connected to a host system (hereinafter, simply referred to as a host) 100.

The HDA includes a magnetic disk (hereinafter, referred to as disk) 10, a spindle motor (hereinafter, referred to as SPM) 12, an arm 13 on which a head 15 is mounted, and a voice coil motor (hereinafter, referred to as VCM) 14. The disk 10 is attached to the SPM 12 and rotates by driving the SPM 12. The arm 13 and the VCM 14 make up an actuator. The actuator controls the movement of the head 15 mounted on the arm 13 to a predetermined position on the disk 10 by driving the VCM 14. Two or more numbers of the disk 10 and the head 15 may be provided. In the disk 10, a shingled magnetic recording (SMR) area 10a and a media cache area 10b (also referred to as media cache) are allocated to the data area. Hereinafter, a direction orthogonal to the radial direction of the disk 10 is referred to as a circumferential direction. The disk 10 may be allocated for a user data area to be written by a normal recording system which is not a shingled write system, a system area for writing information necessary for system management, and the like.

In the shingled recording area 10a, user data and the like requested to be written from the host 100 is recorded. The media cache area 10b may be used as a cache of the shingled recording area 10a. In the shingled recording area 10a, the track to be written next is overwritten on a part of the track which is currently written. Therefore, the track density (i.e., Track Per Inch: TPI) of the shingled recording area 10a is higher than the track density of the area in which data is written by a non-SMR recording system, which is not overwritten. In the shingled recording area 10a, a plurality of track groups including a plurality of overwritten tracks are arranged with a gap therebetween. Hereinafter, a group of tracks including a plurality of overwritten tracks will be referred to as a band area. The band area includes at least one track in which radially adjacent tracks (hereinafter, referred to as adjacent track) are partially overwritten and a lastly overwritten track (also referred to as last track). Since another track is not overwritten on the last track, the track width of the last track is wider than those of the tracks on which other tracks are partially overwritten. Hereinafter, a track written to the disk 10 is referred to as a write track. The area of the remaining write track except the area over which adjacent tracks are overwritten is called a read track. In addition, the write track may be simply referred to as a track, or the read track may be simply referred to as a track, and the write track and the read track may be collectively referred to simply as a track in some cases. A track includes a plurality of sectors. For example, each of the plurality of sectors includes an error correction code. The error correction code includes, for example, a low density parity check (LDPC) code and the like. "Track" is used for data extending in the circumferential direction of the disk 10, an area extending in the circumferential direction of the disk 10, a track or path of the head 15 (i.e., the path of movement of the head), and other various meanings. "Sector" is used for a predetermined area of a track, for example, data written in a sector, a predetermined area of a track, or various other meanings. In addition, the width in the radial direction of the write track is referred to as a write track width and the width in the radial direction of the read track is referred to as a read track width in some cases. The write track width may be simply referred to as a track width, or the read track width may be simply referred to as a track width, and the write track width and the read track width may be collectively referred to simply as a track width in some cases.

Figure 2:
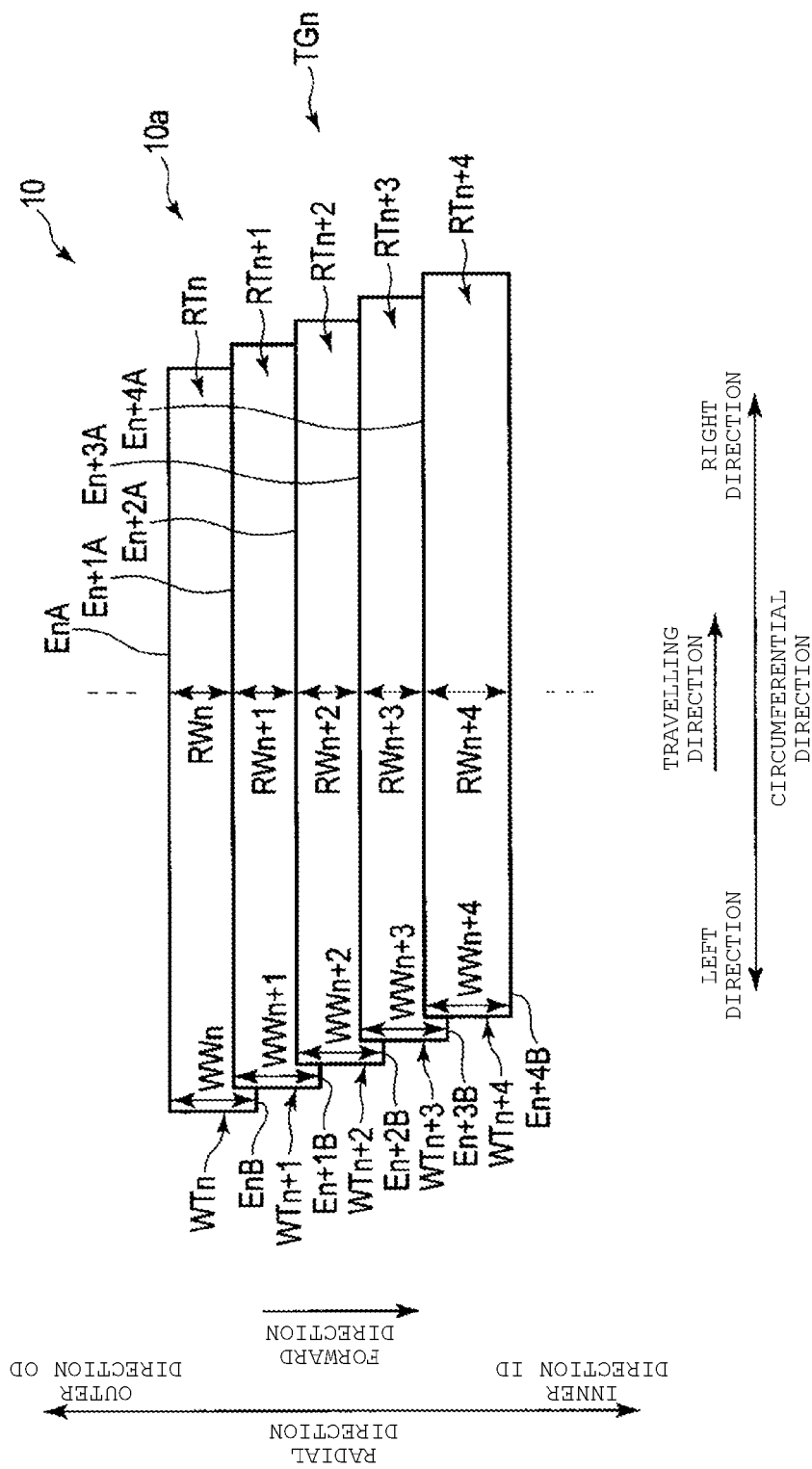
FIG. 2 is a schematic diagram of a shingled write area.

FIG. 2 is a schematic diagram showing the shingled write area 10a in which data is written. In FIG. 2, the vertical axis shows the radial direction of the disk 10, and the horizontal axis shows the circumferential direction of the disk 10. In the radial direction, the direction toward the center of the disk 10 is referred to as an inner direction (inside) ID, and the direction opposite to the inner direction is referred to as an outer direction (outside) OD. In addition, in the radial direction, the direction in which data is written and read is referred to as a forward direction. In the example shown in FIG. 2, the forward direction is the same direction as the inner direction ID. The forward direction may be the same direction as the outer direction OD. In the circumferential direction, one direction is defined as the right direction, and the opposite direction to the right direction is defined as the left direction. In addition, in the circumferential direction, the direction in which data is written and read is referred to as a travelling direction. For example, the travelling direction is opposite to the rotating direction of the disk 10. In the example shown in FIG. 2, the travelling direction is the same direction as the right direction. The travelling direction may be the same direction as the left direction.

In the example shown in FIG. 2, the shingled recording area 10a includes a band area TGn. In FIG. 2, for convenience of description, each track in the band area TGn extends linearly. In reality, each track in the band area TGn is a concentric circle that is curved along the shape of the disk 10. That is, in reality, the left end and the right end of each track in the band area TGn coincide. In addition, in reality, each track in the band area TGn is deviated due to disturbance and other structures. The shingled recording area 10a may include two or more band areas.

In the example shown in FIG. 2, the band area TGn includes write tracks WTn, WTn+1, WTn+2, WTn+3, and WTn+4. The write tracks WTn and WTn+1 partially overlap each other. The write tracks WTn+1 and WTn+2 partially overlap each other. The write tracks WTn+2 and WTn+3 partially overlap each other. The write tracks WTn+3 and WTn+4 partially overlap each other. In the band area TGn, the write tracks WTn to WTn+4 are overwritten in this order in the radial direction. The band area TGn includes five tracks, but may include fewer than five tracks or may include more tracks than five tracks.

The write track WTn has a track edge EnA and a track edge EnB. In the example shown in FIG. 2, the track edge EnA is the end of the write track WTn in the outer direction OD, and the track edge EnB is the end of the write track WTn in the inner direction ID or the forward direction. The write track WTn+1 has a track edge En+1A and a track edge En+1B. In the example shown in FIG. 2, the track edge En+1A is the end portion of the write track WTn+1 in the outer direction OD, and the track edge En+1B is the end of the write track WTn+1 in the inner direction ID. The write track WTn+2 has a track edge En+2A and a track edge En+2B. In the example shown in FIG. 2, the track edge En+2A is the end portion of the write track WTn+2 in the outer direction OD, and the track edge En+2B is the end of the write track WTn+2 in the inner direction ID. The write track WTn+3 has a track edge En+3A and a track edge En+3B. In the example shown in FIG. 2, the track edge En+3A is the end portion of the write track WTn+3 in the outer direction OD, and the track edge En+3B is the end of the write track WTn+3 in the inner direction ID. The write track WTn+4 (i.e., the last track) has a track edge En+4A and a track edge En+4B. In the example shown in FIG. 2, the track edge En+4A is the end portion of the write track WTn+4 in the outer direction OD, and the track edge En+4B is the end of the write track WTn+4 in the inner direction ID.

The write track width WWn of the write track WTn is the radial length between the track edges EnA and EnB. The write track width WWn+1 of the write track WTn+1 is the radial length between the track edges En+1A and En+1B. The write track width WWn+2 of the write track WTn+2 is the radial length between the track edges En+2A and En+2B. The write track width WWn+3 of the write track WTn+3 is the radial length between the track edges En+3A and En+3B. The write track width WWn+4 of the write track WTn+4 is the radial length between the track edges En+4A and En+4B. The write track widths WWn to WWn+4 are, for example, equivalent. The write track widths WWn to WWn+4 may be different.

A read track RTn is the remaining area excluding a part of the write track WTn overwritten with the write track WTn+1. A read track RTn+1 is the remaining area excluding a part of the write track WTn+1 overwritten with the write track WTn+2. A read track RTn+2 is the remaining area excluding a part of the write track WTn+2 overwritten with the write track WTn+3. A read track RTn+3 is the remaining area excluding a part of the write track WTn+3 overwritten with the write track WTn+4. A read track RTn+4 corresponds to the write track WTn+4. The read track RTn+4 corresponds to the last track in the band area TGn.

A read track width RWn of the read track RTn is the radial length between the track edges EnA and En+1A. A read track width RWn+1 of the read track RTn+1 is the radial length between the track edges En+1A and En+2A. A read track width RWn+2 of the read track RTn+2 is the radial length between the track edges En+2A and En+3A. A read track width RWn+3 of the read track RTn+3 is the radial length between the track edges En+3A and En+4A. A read track width RWn+4 of the read track RTn+4 is the radial length between the track edges En+4A and En+4B. That is, the read track width RWn+4 is equivalent to the write track width WWn+4.

The head 15 includes a write head 15W and a read head 15R mounted on the slider as a main body. The write head 15W writes data on the disk 10. The read head 15R reads the data recorded on the disk 10. The write head 15W may be simply referred to as a head 15, the read head 15R may be simply referred to as a head 15, and the write head 15W and the read head 15R may be collectively referred to as a head 15 in some cases.

A driver IC 20 controls the driving of the SPM 12 and the VCM 14 according to the control of the system controller 130 (more specifically, an MPU 60 to be described later).

The head amplifier IC 30 includes a read amplifier and a write driver. The read amplifier amplifies the read signal read from the disk 10 and outputs the amplified signal to the system controller 130 (more specifically, a read/write (R/W) channel 40 to be described later). The write driver outputs a write current corresponding to the signal output from the R/W channel 40 to the head 15.

The volatile memory 70 is a semiconductor memory in which stored data is lost when power supply is cut off. The volatile memory 70 stores data and the like necessary for processing in each part of the magnetic disk device 1. The volatile memory 70 is, for example, dynamic random-access memory (DRAM) or synchronous dynamic random-access memory (SDRAM).

The buffer memory 80 is a semiconductor memory that temporarily stores data and the like transmitted and received between the magnetic disk device 1 and the host 100. The buffer memory 80 may be integrated with the volatile memory 70. The buffer memory 80 is, for example, DRAM, static random access memory (SRAM), SDRAM, ferroelectric random access memory (FeRAM), magnetoresistive random access memory (MRAM), or the like.

The non-volatile memory 90 is a semiconductor memory that stores data stored even when power supply is cut off. The non-volatile memory 90 is, for example, a NOR type or NAND type flash ROM (Flash Read Only Memory: FROM).

The system controller 130 is implemented by a large scale integrated circuit (LSI) called system-on-a-chip (SoC) in which a plurality of elements are integrated on a single chip, for example. The system controller 130 includes a read/write (R/W) channel 40, a hard disk controller (HDC) 50, a microprocessor (MPU) 60, and the like. The system controller 130 is electrically connected to, for example, the driver IC 20, the head amplifier IC 30, the volatile memory 70, the buffer memory 80, the non-volatile memory 90, the host system 100, and the like.

The R/W channel 40 executes signal processing of read data to be transferred from the disk 10 to the host 100 and write data to be transferred from the host 100 in response to an instruction from the MPU 60 to be described later. The R/W channel 40 has a circuit or a function for measuring signal quality of read data. The R/W channel 40 is electrically connected to the head amplifier IC 30, the HDC 50, the MPU 60, and the like, for example.

The HDC 50 controls data transfer between the host 100 and the R/W channel 40 in response to an instruction from the MPU 60 to be described later. The HDC 50 is electrically connected to, for example, the R/W channel 40, the MPU 60, the volatile memory 70, the buffer memory 80, the non-volatile memory 90, and the like.

The MPU 60 is a main controller that controls each part of the magnetic disk device 1. The MPU 60 controls the VCM 14 via the driver IC 20 and executes servo control for positioning the head 15. The MPU 60 controls the write operation of the data to the disk 10 and selects a save destination of the write data. In addition, the MPU 60 controls the read operation of data from the disk 10 and controls the processing of the read data. The MPU 60 is connected to each part of the magnetic disk device 1. The MPU 60 is electrically connected to the driver IC 20, the R/W channel 40, the HDC 50, and the like, for example.

The MPU 60 includes a read/write control unit 61, a parity data management unit 62, an error correction unit 63, and a DOL management unit 64. The MPU 60 executes the processing of these units, for example, the read/write control unit 61, the parity data management unit 62, the error correction unit 63, the DOL management unit 64, and the like implemented as a firmware. The MPU 60 may include these units as circuits. In addition, the parity data management unit 62 and the error correction unit 63 may be provided in the R/W channel 40.

The read/write control unit 61 controls data read processing and write processing according to a command from the host 100. The read/write control unit 61 controls the VCM 14 via the driver IC 20, positions the head 15 at a predetermined position on the disk 10, and reads or writes data. For example, the read/write control unit 61 seeks a predetermined radial position (hereinafter, referred to as radial position) of a predetermined circumferential position (hereinafter, referred to as circumferential position) for the head 15 on the disk 10. The read/write control unit 61 positions the head 15 at a predetermined radial position (hereinafter, referred to as target position) as a target and writes data to a predetermined sector or reads data from the predetermined sector. The read/write control unit 61 positions the head 15 at a plurality of target positions corresponding to a plurality of circumferential positions aligned concentrically with the disk 10 and writes a predetermined track. Hereinafter, the path of the head 15 indicated by each target position at each circumferential position of the predetermined track is referred to as a target path. In the case of executing shingled recording, the read/write control unit 61 sequentially writes data from the predetermined sector in a predetermined band area. In the case of reading the predetermined band area, the read/write control unit 61 sequentially reads data from the predetermined sector in this band area. Hereinafter, "positioning or arranging the central portion of the head 15 (i.e., write head 15W or read head 15R) at a predetermined position" may be simply expressed as "positioning or arranging the head 15 (i.e., write head 15W or read head 15R) at a predetermined position" in some cases. The read/write control unit 61 may write data by a non-shingled recording method instead of the shingled write method.

The read/write control unit 61 controls the write processing based on an error (hereinafter, referred to as an offset amount or a positioning error) between the target position and the actual radial position of the head 15 (hereinafter, referred to as actual position). For example, the read/write control unit 61 acquires a threshold value (e.g., a DOL) of the offset amount corresponding to the track to be currently written (hereinafter, referred to as current track), based on the offset amount (hereinafter, referred to as previous offset amount) corresponding to a previously written track (hereinafter, referred to as previous track). In a case where the offset amount corresponding to the current track (hereinafter, referred to as current offset amount) exceeds DOL, the read/write control unit 61 prohibits (or interrupts) the write processing. In this way, the function of controlling the write processing based on the previous offset amount and the current offset amount may be referred to as DDOL function or DDOL in some cases.

The parity data management unit 62 manages XOR operation values (hereinafter, referred to as "parity data" or "operation values") acquired by an exclusive OR (XOR) operation. For example, the parity data management unit 62 executes an XOR operation on the data transferred from the host 100 or the data read from the disk 10 and acquires parity data as the result of the XOR operation. The parity data management unit 62 writes the parity data to a predetermined sector of the predetermined track of the disk 10 via the read/write control unit 61. Hereinafter, a sector in which parity data is written is referred to as a parity sector. In one example, the parity data management unit 62 executes an XOR operation on data of all sectors read from the predetermined track or written to the predetermined track and writes the parity data obtained as a result of the XOR operation on the data of all the sectors to a parity sector of this track. The parity data management unit 62 writes each parity data corresponding to each track of the disk 10 to each parity sector corresponding to each track. The parity data management unit 62 may manage whether the parity data is valid or not by a table or the like. In addition, the parity data management unit 62 may execute an XOR operation on data of several sectors out of all the sectors of the predetermined track and record the parity data acquired as a result of the XOR operation on the data of several sectors in a memory, for example, the shingled recording area 10*a*, the media cache 10*b*, the volatile memory 70, or the buffer memory 80.

The error correction unit 63 detects written data (hereinafter, referred to as read error data) that is not readable in a sector (hereinafter, referred to as read error sector) or that cannot be read even if reading is performed a predetermined number of times or more, and corrects the detected read error data (hereinafter, referred to as error correction or correction). The error correction unit 63 executes error correction on a track basis, for example. In a case where a read error sector is detected in the predetermined track, the error correction unit 63 corrects the read error data written in the detected read error sector based on the parity data corresponding to this track. In one example, the error correction unit 63 may correct the read error data respectively written to the two read error sectors out of all the sectors of this track based on the parity data corresponding to the predetermined track. The error correction unit 63 may correct only one piece of read error data or correct three or more pieces of read error data based on the parity data corresponding to the predetermined track. The error correction unit 63 may perform error correction based on the error correction code.

Figure 3:
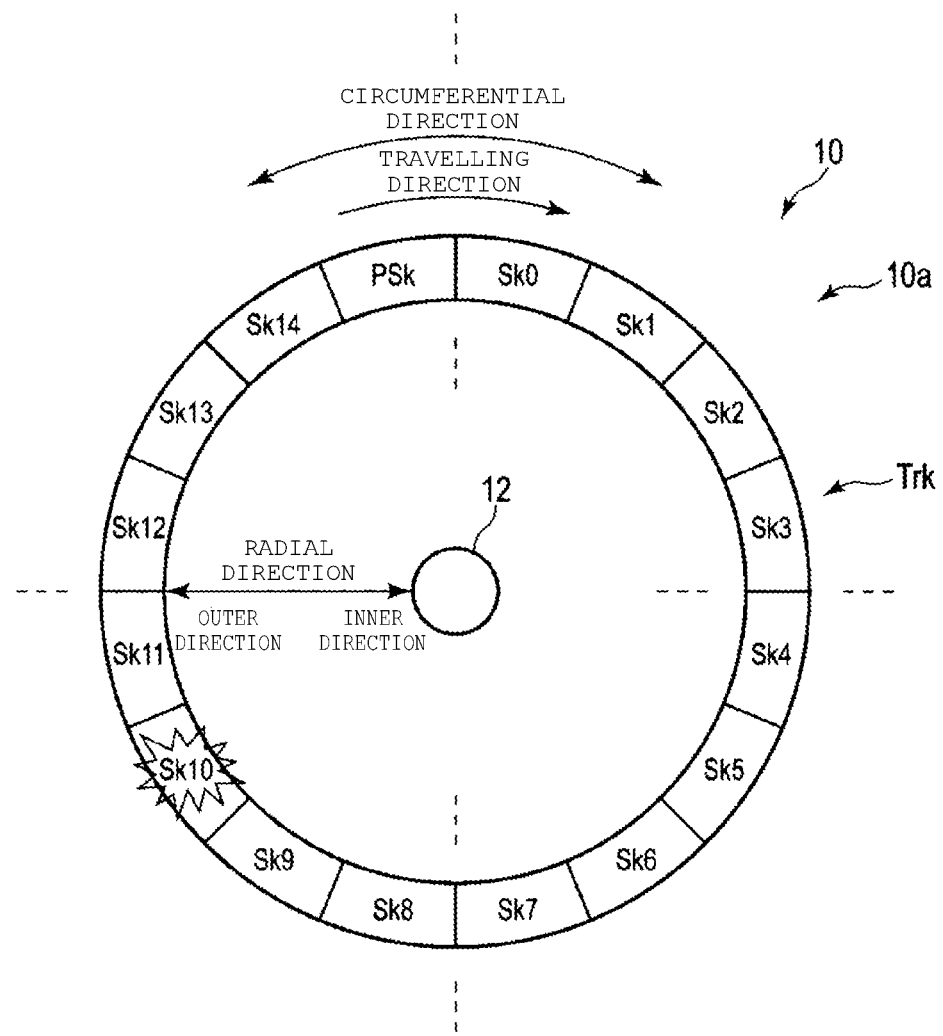
FIG. 3 is a schematic diagram showing a track unit error correction method according to the first embodiment.

FIG. 3 is a schematic diagram showing a track unit error correction method according to the present embodiment.

FIG. 3 shows a track of the disk, Trk. The track Trk may be a write track or a read track of a predetermined band area or may be a track written by a non-shingled recording method. In FIG. 3, the track Trk is concentric with the disk 10, but may have a shape other than a circular shape. The track Trk includes sectors Sk0, Sk1, Sk2, Sk3, Sk4, Sk5, Sk6, Sk7, Sk8, Sk9, Sk10, Sk11, Sk12, Sk13, Sk14, and a parity sector PSk. The track Trk may further include other sectors or may not include some sectors of the sectors Sk0 to Sk14. In FIG. 3, the sector Sk10 is a read error sector.

For example, the read/write control unit 61 first writes user data in the sector Sk0 in the track Trk. The read/write control unit 61 writes the user data along the travelling direction from the sector Sk0 to the sector Sk14.

The parity data management unit 62 executes an XOR operation on a plurality of pieces of user data respectively corresponding to the sectors Sk0 to Sk14 and acquires parity data as a result of the XOR operation on the plurality of pieces of user data corresponding to the sectors Sk0 to Sk14 respectively.

The read/write control unit 61 writes the parity data corresponding to the plurality of pieces of data respectively corresponding to the sectors Sk0 to Sk14 to the parity sector PSk located next to or adjacent to the travelling direction of the sector Sk14 in which the user data is written last in the track Trk.

The read/write control unit 61 reads data from the sector Sk0 to the sector Sk14 along the travelling direction.

The error correction unit 63 detects the read error data of the read error sector Sk10 that cannot be read and corrects the read error data written in the read error sector Sk10 based on the parity data written in the parity sector PSk.

The DOL management unit 64 manages indices (hereinafter, referred to as error correction indices or evaluation value) corresponding to the possibility of correcting the read error data based on a plurality of offset amount values (hereinafter, referred to as DOL setting values) corresponding to the DOL of the predetermined track or the parity data, error correction code, and the like in the current track (or the adjacent track). Here, the error correction indices include the sum of the amounts (hereinafter, simply referred to as sum) by which the offset amount exceeds the DOL or one DOL setting value among the plurality of DOL setting values (hereinafter, referred to as an excess amount), the number of times that the offset amount exceeds the DOL or one DOL setting value among the plurality of DOL setting values (hereinafter, referred to as an excess count), and the like. In a case where data is written to a predetermined track, the DOL management unit 64 generates a plurality of DOL setting values corresponding to the predetermined track based on the previous offset amount and the error correction indices. The DOL management unit 64 may adjust a plurality of preset DOL setting values based on the previous offset amount or may have a plurality of DOL setting values in advance. In a case where data is written to the predetermined track, the DOL management unit 64 sets one DOL setting value among a plurality of DOL setting values as DOL based on the previous offset amount and the error correction indices. In a case where data is written on the predetermined track, the DOL management unit 64 changes the DOL based on the error correction indices. In a case where the offset amount exceeds the DOL, the DOL management unit 64 prohibits (or interrupts) the write processing via the read/write control unit 61.

In a case where it is determined that the error correction indices, for example, the sum and the excess count are smaller than predetermined threshold values, the DOL management unit 64 determines that there is a high possibility of correcting the read error data or that the read error data may be corrected, based on the parity data and the error correction code, and sets a DOL setting value having the largest absolute value among the plurality of DOL setting values (hereinafter, referred to as the maximum setting value) corresponding to this track to the DOL. In other words, in a case where it is determined that the sum is smaller than a predetermined threshold value (hereinafter, referred to as threshold value of the sum) and the excess count is smaller than a predetermined threshold value (hereinafter, referred to as threshold value of the excess count), the DOL management unit 64 sets the maximum setting value to the DOL.

In a case where it is determined that at least one of the error correction indices, for example, at least one of the sum total and the excess count, is greater than the predetermined threshold value, the DOL management unit 64 determines that there is a small possibility of correcting the read error data or that the read error data cannot be corrected, based on the parity data and the error correction code, and changes the DOL from the maximum setting value to a predetermined DOL setting value whose absolute value is smaller than the maximum setting value among the plurality of DOL setting values corresponding to the predetermined track. In other words, in a case where it is determined that the sum is greater than a threshold value of the sum, the DOL management unit 64 changes DOL from the maximum setting value to a predetermined DOL setting value smaller than the maximum setting value. In a case where it is determined that the excess count is greater than a threshold value of the excess count, the DOL management unit 64 changes the DOL from the maximum setting value to a predetermined DOL setting value smaller than the maximum setting value. In a case where it is determined that the sum is greater than the threshold value of the sum and the excess count is greater than the threshold value of the excess count, the DOL management unit 64 changes the DOL from the maximum setting value to a predetermined DOL setting value smaller than the maximum setting value.

In one example, in a case where the sum of the amounts (hereinafter, referred to as the sum of the minimum excess amounts) by which the predetermined offset amount exceeds the DOL setting value having the smallest absolute value among the plurality of DOL setting values (hereinafter, referred to as the minimum setting value) and the excess count in which the predetermined offset amount exceeds the minimum setting value are smaller than the predetermined threshold values (hereinafter, referred to as the minimum excess count), the DOL management unit 64 sets the DOL of this track to the maximum setting value. In other words, in a case where the sum of the minimum excess amounts in the predetermined track is smaller than the threshold value of the sum and the minimum excess count is smaller than the threshold value of the excess count, the DOL management unit 64 sets the DOL of this track to the maximum setting value. In addition, in a case where at least one of the sum of the minimum excess amounts and the minimum excess count in the predetermined track is greater than the predetermined threshold value, the DOL management unit 64 changes the DOL corresponding to this track from the maximum setting value to the minimum setting value. In other words, in a case where the sum of the minimum excess amounts in the predetermined track is greater than the threshold value of the sum, the DOL management unit 64 changes the DOL corresponding to this track from the maximum setting value to the minimum setting value. In a case where the sum of the minimum excess count is greater than the threshold value of the excess count in the predetermined track, the DOL management unit 64 changes the DOL corresponding to this track from the maximum setting value to the minimum setting value. In a case where the sum of the minimum excess amounts is greater than the threshold value of the sum in the predetermined track and the minimum excess count is greater than the threshold value of the excess count, the DOL management unit 64 changes the DOL corresponding to this track from the maximum setting value to the minimum setting value.

The DOL management unit 64 may decrease the DOL step by step each time at least one of the sum and the excess count exceeds a predetermined value in the predetermined track. In other words, the DOL management unit 64 decreases the DOL step by step each time the sum exceeds a predetermined value that is smaller than the threshold value of the sum in the predetermined track (hereinafter, referred to as DOL change value of the sum). The DOL change value of the sum includes, for example, a plurality of values. In a case where the sum exceeds the threshold value of the sum, the DOL management unit 64 sets the minimum setting value to DOL. The DOL management unit 64 decreases the DOL step by step each time the excess count exceeds a predetermined value that is smaller than the threshold value of the excess count in the predetermined track (hereinafter, referred to as DOL change value of the excess count). The DOL change value of the excess count includes, for example, a plurality of values. In a case where the excess count exceeds the threshold value of the number of excesses, the DOL management unit 64 sets the minimum setting value to DOL. The DOL management unit 64 decreases the DOL step by step each time the sum exceeds the DOL change value of the sum and the excess count exceeds the DOL change value of the excess count in the predetermined track.

Figure 4:
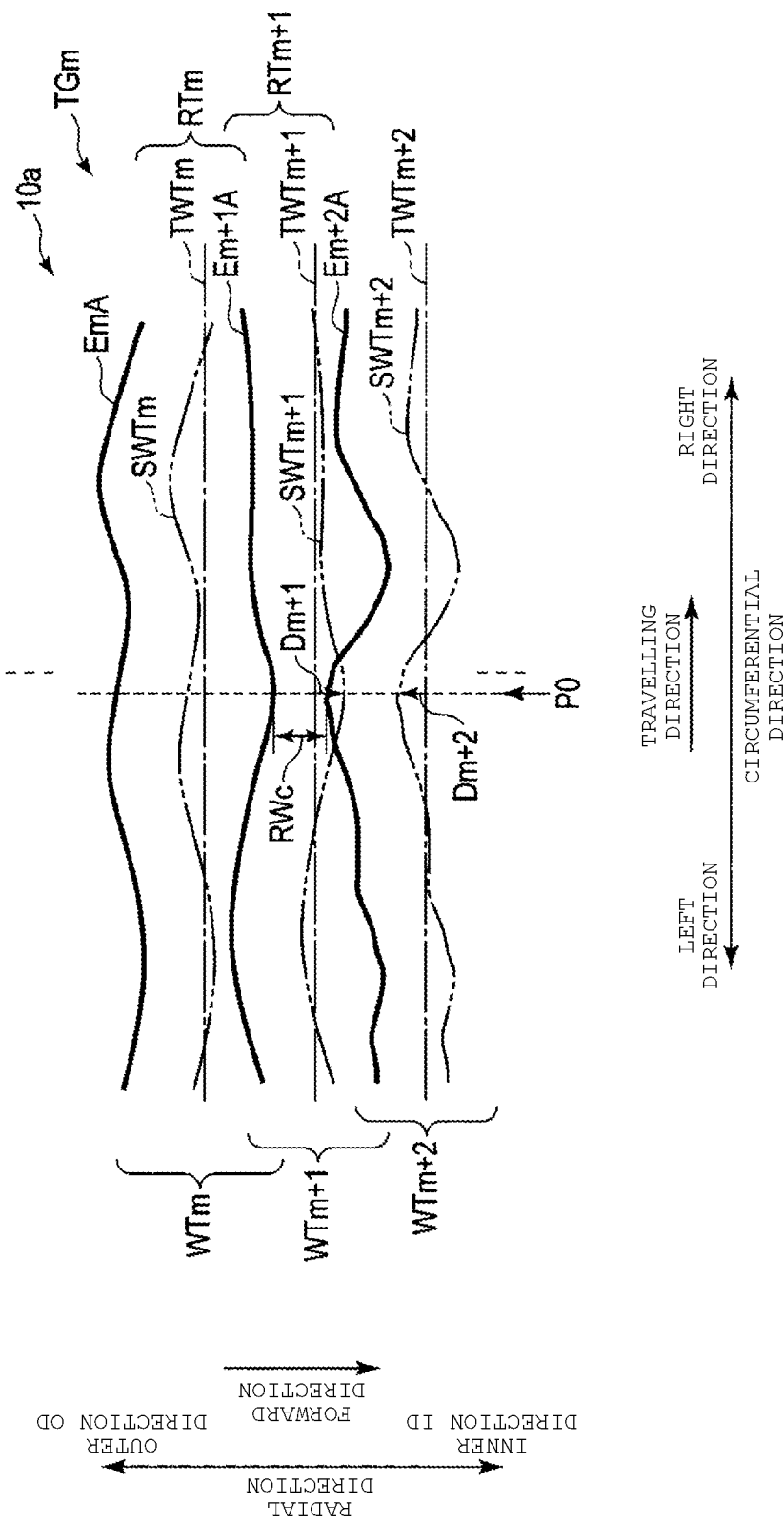
FIG. 4 is a schematic diagram explaining Dynamic Drift-off Level (DDOL).

FIG. 4 is a schematic diagram explaining DDOL. In the example shown in FIG. 4, a band area TGm indicates a write track WTm, a write track WTm+1, and a write track WTm+2. In the band area TGm, the write tracks WTm to WTm+2 are overwritten in this order in the forward direction. FIG. 4 shows a target path TWTm in the write track WTm and a path SWTm of the head 15 indicated by each actual position in each circumferential position (hereinafter, referred to as actual path). The write track WTm is written by positioning the head 15 on the actual path SWTm. The write track WTm has a track edge EmA. The track edge EmA is the end of the write track WTm in the outer direction OD. FIG. 4 shows a target path TWTm+1 and an actual path SWTm+1 in the write track WTm+1. The write track WTm+1 is written by positioning the head 15 to the actual path SWTm+1. The write track WTm+1 has a track edge Em+1A. The track edge Em+1A is the end of the write track WTm+1 in the outer direction OD. A read track RTm is arranged between the track edges EmA and Em+1A. FIG. 4 shows a target path TWTm+2 and an actual path SWTm+2 in the write track WTm+2. The write track WTm+2 is written by positioning the head 15 to the actual path SWTm+2. The write track WTm+2 has a track edge Em+2A. The track edge Em+2A is the end of the write track WTm+1 in the outer direction OD. A read track RTm+1 is arranged between the track edges Em+1A and Em+2A. A read track width RWc is the radial length of the read track RTm+1 at a circumferential position P0. The read track width RWc is, for example, the lower limit value of the read track width from which the read track RTm+1 may be read. In FIG. 4, the target paths TWTm, TWTm+1, and TWTm+2 are, for example, concentric paths with the disk 10.

The read/write control unit 61 writes the write track WTm by positioning the head 15, for example, the write head 15W so as to follow the target path TWTm. Actually, in the case of writing the write track WTm, the write head 15W runs on the actual path SWTm. Therefore, the read/write control unit 61 writes the write track WTm based on the actual path SWTm.

The read/write control unit 61 positions the write head 15W so as to follow the target path TWTm+1 and writes the write track WTm+1. Actually, in the case of writing the write track WTm+1, the write head 15W runs on the actual path SWTm+1. Therefore, the read/write control unit 61 writes the write track WTm+1 based on the actual path SWTm+1. When the write track WTm+1 is written, the read/write control unit 61 writes the data at an offset amount Dm+1 in the forward direction at the circumferential position P0.

The read/write control unit 61 writes the write track WTm+2 by positioning the head 15, for example, the write head 15W so as to follow the target path TWTm+2. Actually, in the case of writing the write track WTm+2, the write head 15W runs on the actual path SWTm+2. Therefore, the read/write control unit 61 writes the write track WTm+2 based on the actual path SWTm+2. When the write track WTm+2 is written, the read/write control unit 61 writes the data at an offset amount Dm+2 in the opposite direction to the forward direction, which is identical with the outer direction, at the circumferential position P0. For example, the DOL management unit 64 sets the DOL at the circumferential position P0 of the write track WTm+2 based on the offset amount Dm+1 of the circumferential position P0 of the write track WTm+1 and the error correction indices. When the offset amount Dm+2 exceeds the DOL at the circumferential position P0 of the write track WTm+2, the DOL management unit 64 interrupts the write processing.

Figure 5:
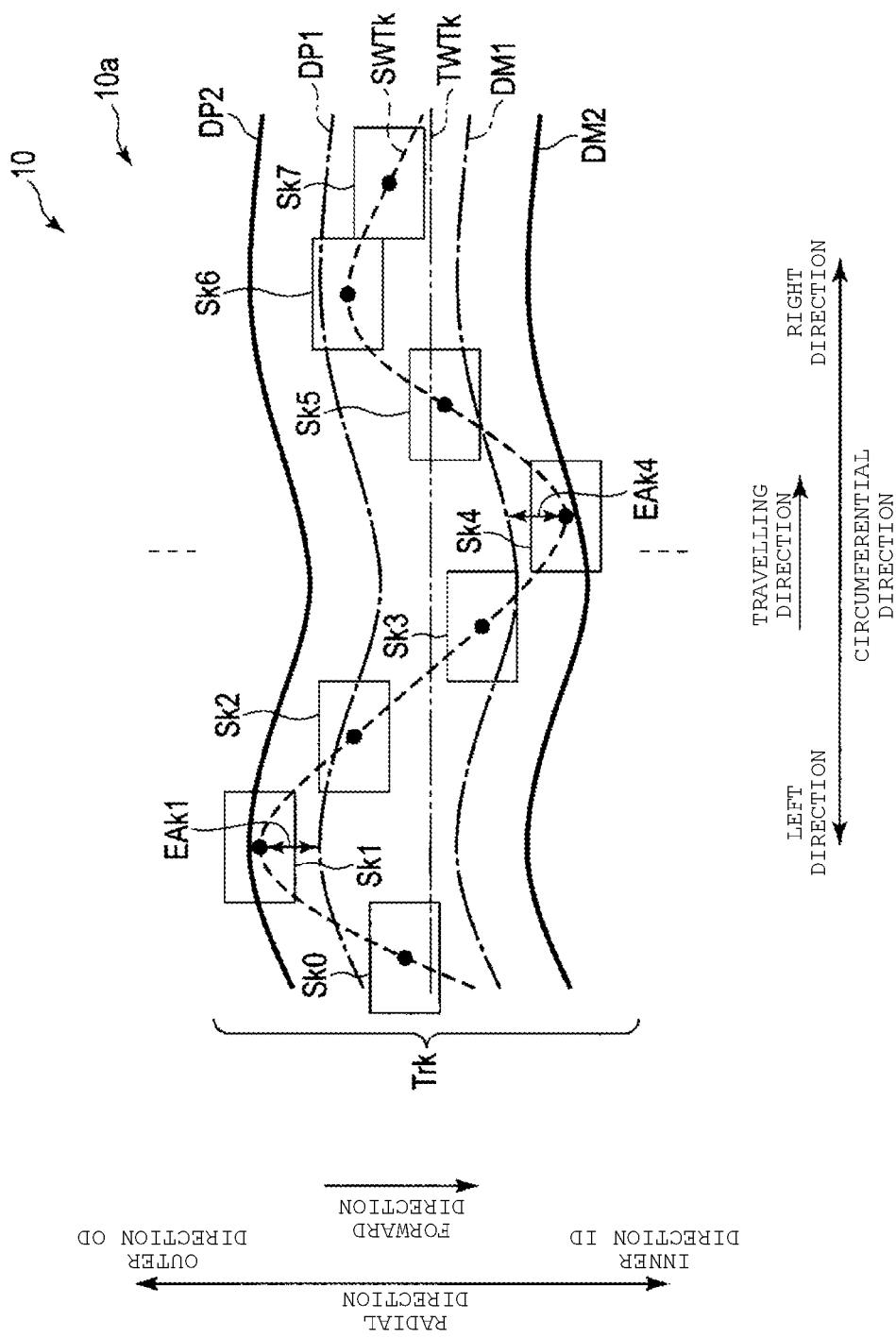
FIG. 5 is a schematic diagram showing a DOL management method according to the first embodiment.

FIG. 5 is a schematic diagram showing a DOL management method according to the present embodiment. FIG. 5 shows a part of the track Trk shown in FIG. 3. FIG. 5 shows a target path TWTk and an actual path SWTk in the track Trk. The target path TWTk is, for example, a path concentric with the disk 10. In FIG. 5, the offset amount in the outer direction with respect to the target path TWTk is a positive value, and the offset amount in the inner direction with respect to the target path TWTk is a negative value. The offset amount in the outer direction with respect to the target path TWTk may be a negative value, and the offset amount in the inner direction with respect to the target path TWTk may be a positive value.

In addition, FIG. 5 shows minimum setting values DP1 and DM1 and maximum setting values DP2 and DM2. For example, the maximum setting values DP2 and DM2 are set as DOL in a case where it is determined that the error correction indices are smaller than the predetermined threshold values. For example, the minimum setting values DP1 and DM1 are set as DOL in a case where it is determined that the error correction indices are greater than the predetermined threshold values. The minimum setting value DP1 and the maximum setting value DP2 are located in the outer direction with respect to the target path TWTk. Hereinafter, the minimum setting value DP1 is referred to as the outer minimum setting value DP1, and the maximum setting value DP2 is referred to as the outer maximum setting value DP2. The minimum setting value DM1 and the maximum setting value DM2 are located in the inner direction with respect to the target path TWTk. Hereinafter, the minimum setting value DM1 is referred to as the inner minimum setting value DM1, and the maximum setting value DM2 is referred to as the inner maximum setting value DM2. Another DOL setting value may be set between the minimum setting values DP1 and DM1 and the maximum setting values DP2 and DM2.

In the example shown in FIG. 5, the outer minimum setting value DP1 and the inner minimum setting value DM1 have the same shape. The outer minimum setting value DP1 and the inner minimum setting value DM1 extend in the circumferential direction while being spaced apart at the same interval in the radial direction, for example. In the example shown in FIG. 5, the outer maximum setting value DP2 and the inner maximum setting value DM2 have the same shape in the circumferential direction. The outer maximum setting value DP2 and the inner maximum setting value DM2 extend in the circumferential direction while being spaced at the same interval in the radial direction, for example. The outer maximum setting value DP2 and the outer minimum setting value DP1 extend in the circumferential direction while being spaced apart at the same interval in the radial direction, for example. The inner maximum setting value DM2 and the inner minimum setting value DM1 extend in the circumferential direction while being spaced at the same interval in the radial direction, for example. The outer minimum setting value DP1 and the inner minimum setting value DM1 may extend in the circumferential direction while being spaced at different intervals in the radial direction. The outer maximum setting value DP2 and the inner maximum setting value DM2 may extend in the circumferential direction while being spaced at different intervals in the radial direction. The outer maximum setting value DP2 and the outer minimum setting value DP1 may extend in the circumferential direction while being spaced at different intervals in the radial direction. The inner maximum setting value DM2 and the inner minimum setting value DM1 may extend in the circumferential direction while being spaced at different intervals in the radial direction.

In FIG. 5, the sectors Sk0 to Sk7 (or the data written to those sectors) are shown. The central portion of the sectors Sk0 to Sk7 (or the data written to those sectors) is located on the actual path SWTk. The sector Sk1 is shifted in the outer direction by an excess amount EAk1 from the outer minimum setting value DP1. The sector Sk4 is shifted in the inner direction by an excess amount EAk4 from the inner minimum setting value DM1.

The read/write control unit 61 writes the track Trk by positioning the head 15, for example, the write head 15W so as to follow the target path TWTk. Actually, in the case of writing the track Trk, the write head 15W runs on the actual path SWTk. Therefore, the read/write control unit 61 writes the track Trk based on the actual path SWTk.

In a case where the write processing of the track Trk is started, the DOL management unit 64 initializes the sum and the excess count corresponding to the previous track, for example, sets them to 0. In addition, the DOL management unit 64 changes the threshold value of the sum, the threshold of the excess count, the DOL, and the like corresponding to the track before the track Trk to the threshold value of the sum, the threshold value of the excess count, the DOL, and the like corresponding to the track Trk. For example, the DOL management unit 64 sets the maximum setting values DP2 and DM2 to DOL based on the offset amount and the error correction indices of the track before the track Trk. When data is written in the sector Sk1, the DOL management unit 64 detects that the head 15 is displaced in the outer direction from the outer minimum setting value DP1. In other words, the DOL management unit 64 detects that the offset amount exceeds the outer minimum setting value DP1 when data is written to the sector Sk1. In a case where it is detected that the offset amount exceeds the outer minimum setting value DP1 in the sector Sk1, the DOL management unit 64 acquires the excess amount EAk1 in the sector Sk1 and adds the excess amount EAk1 to a sum (0). In addition, in a case where it is detected that the offset amount exceeds the outer minimum setting value DP1, the DOL management unit 64 increments the excess count, for example, by 1. The DOL management unit 64 determines whether or not the sum (i.e., the sum of the minimum excess amounts) exceeds the threshold value of the sum. In addition, the DOL management unit 64 determines whether or not the excess count (i.e., the minimum number of times of exceeding) exceeds a threshold value of the excess amount. The DOL management unit 64 does not change the DOL in a case where it is determined that the sum has not exceeded the threshold value of the sum and the excess count does not exceed the threshold value of the excess count.

When the data is written in the sector Sk4, the DOL management unit 64 detects that the head 15 is displaced in the inner direction from the inner minimum setting value DM1. In other words, the DOL management unit 64 detects that the offset amount exceeds the inner minimum setting value DM1 when data is written to the sector Sk4. In a case where it is detected that the offset amount exceeds the inner minimum setting value DM1 in the sector Sk4, the DOL management unit 64 acquires the excess amount EAk4 in the sector Sk4 and adds the excess amount EAk4 to a sum (EAk1). In addition, in a case where it is detected that the offset amount exceeds the inner minimum setting value DM1, the DOL management unit 64 increments the excess count, for example, by 1. The DOL management unit 64 determines whether or not the sum (EAk1+EAk4) exceeds the threshold value of the sum. In addition, the DOL management unit 64 determines whether or not the excess count exceeds the threshold value of the excess count. In a case where it is determined that at least one of the sum and the excess count has exceeded the threshold value (i.e., the threshold value of the sum or threshold value of the excess count), the DOL management unit 64 changes DOL from the maximum setting values DP2 and DM2 to the minimum setting values DP1 and DM1. That is, in a case where it is determined that the sum has exceeded the threshold value of the sum, the DOL management unit 64 changes DOL from the maximum setting values DP2 and DM2 to the minimum setting values DP1 and DM1. In a case where it is determined that the excess count has exceeded the threshold value of the excess count, the DOL management unit 64 changes DOL from the maximum setting values DP2 and DM2 to the minimum setting values DP1 and DM1. In a case where it is determined that the sum has exceeded the threshold value of the sum and the excess count has exceeded the threshold value of the excess count, the DOL management unit 64 changes DOL from the maximum setting values DP2 and DM2 to the minimum setting values DP1 and DM1.

Figure 6:
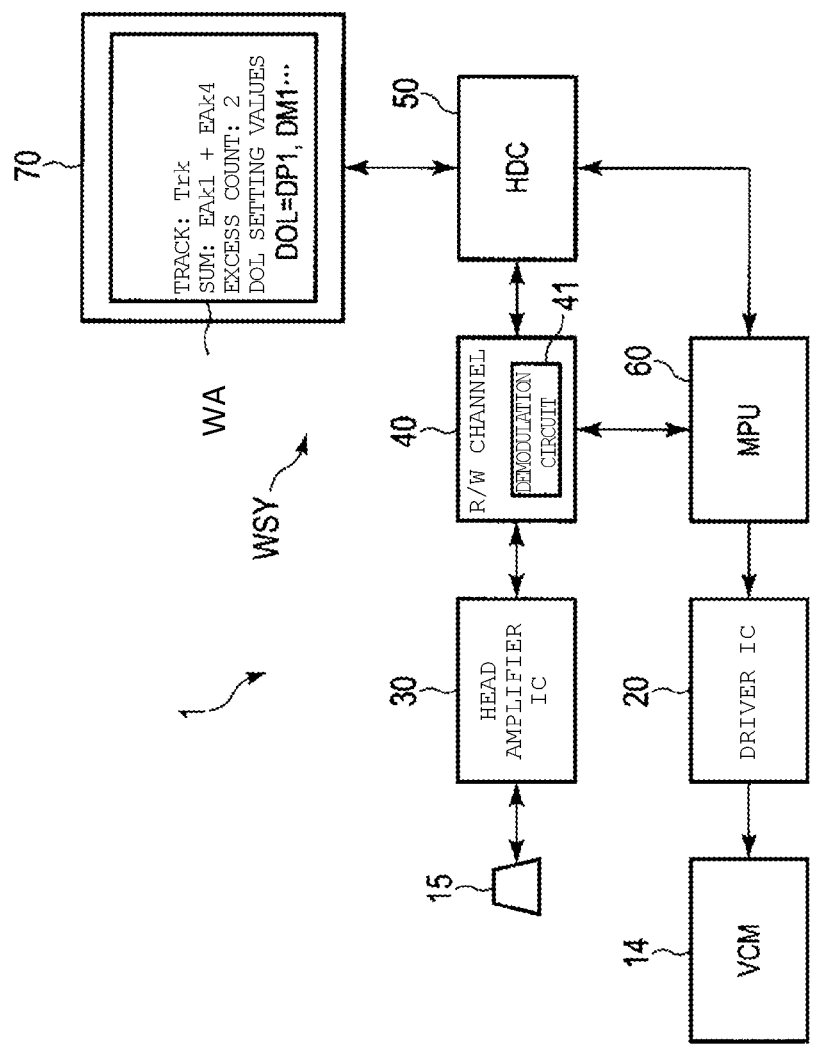
FIG. 6 is a block diagram showing a control system of write processing according to the first embodiment.

FIG. 6 is a block diagram showing a control system of write processing according to the present embodiment. The magnetic disk device 1 includes a control system WSY of the head 15 at the time of write processing (hereinafter, referred to as a write control system). The write control system WSY includes a VCM 14, the head 15, the driver IC 20, the head amplifier IC 30, the R/W channel 40, the HDC 50, the MPU 60, and the volatile memory 70. The write control system WSY may include the buffer 80 or the non-volatile memory 90. The R/W channel 40 has a demodulation circuit 41. The R/W channel 40 may have a modulation circuit. The volatile memory 70 has a working area WA. In a case where the write control system WSY includes the buffer 80 or the non-volatile memory 90, the buffer 80 or the non-volatile memory 90 may have the working area WA. The write control system WSY is controlled by the MPU 60, for example. In FIG. 6, the processing of the write control system will be described with reference to the example shown in FIG. 5.

In the example shown in FIG. 6, in the case of writing the current track, for example, the track Trk, the write control system WSY stores information such as a track number, sum, number of excesses, DOL setting value, DOL, and the like (hereinafter, referred to as write control information) corresponding to the track Trk in the working area WA of the volatile memory 70. In the case of writing data to the sector Sk4, the write control system WSY inputs information related to the radial position (hereinafter, referred to as radial position information), for example, a servo signal, from the head 15 to the head amplifier IC 30. The write control system WSY inputs the radial position information from the head amplifier IC 30 to the demodulation circuit 41 of the R/W channel 40. In the write control system WSY, the demodulation circuit 41 calculates an offset amount based on the radial position information.

The write control system WSY determines, in the HDC 50 or the MPU 60, whether or not the offset amount exceeds the predetermined DOL setting value, for example, the minimum setting values DP1 and DM1. In a case where it is determined that the offset amount has exceeded the minimum setting values DP1 and DM1, in the write control system WSY, the HDC 50 or the MPU 60 calculates the excess amount EAk4 based on the minimum setting values DP1 and DM1, and the offset amount and adds the calculated excess amount EAk4 to the sum EAk1. The write control system WSY records the calculated sum (EAk1+EAk4) in the working area WA. In the write control system WSY, the HDC 50 or the MPU 60 increments the excess count 1 to 2. The write control system WSY records the calculated number of times of exceeding 2 in the working area WA. The write control system WSY determines whether or not the sum (EAk1+EAk4) exceeds the threshold value of the sum and determines whether or not the excess count 2 exceeds the threshold value of the excess count. In a case where it is determined that at least one of the sum (EAk1+EAk4) and the excess count 2 has exceeded the threshold value (i.e., the threshold value of the sum or threshold value the excess count), the write control system WSY changes the DOL from the maximum setting values DP2 and DM2 to the minimum setting values DP1 and DM1 and stores the changed DOL (DP1 and DM1) in the working area WA.

In addition, after writing data to the sector Sk4, the write control system WSY determines whether or not the offset amount exceeds the DOL (DP1 and DM1). In a case where it is determined that the offset amount has exceeded the DOL (DP1 and DM1), the write control system WSY interrupts the write processing via the head amplifier IC 30, the R/W channel 40, the HDC 50, and the MPU 60. In addition, in a case where it is determined that the offset amount has exceeded the DOL, the write control system WSY interrupts the write processing via the VCM 14, the driver IC 20, and the MPU 60 and moves the head 15 to, for example, a radial position not exceeding the DOL. In a case where the head 15 is moved to a radial position not exceeding the DOL after the write processing is interrupted, the write control system WSY resumes the write processing.

In the case of writing the next track adjacent in the forward direction of the track Trk after the write processing of the track Trk is completed, the write control system WSY changes the write control information corresponding to the track Trk stored in the working area WA to the write control information corresponding to the next track. For example, the write control system WSY changes from the track number Trk corresponding to the track Trk to the track number corresponding to the next track, sets the sum and the excess count to 0, and changes the plurality of DOL setting values and DOL corresponding to the track Trk to the plurality of DOL setting values and DOL corresponding to the next track.

Figure 7:
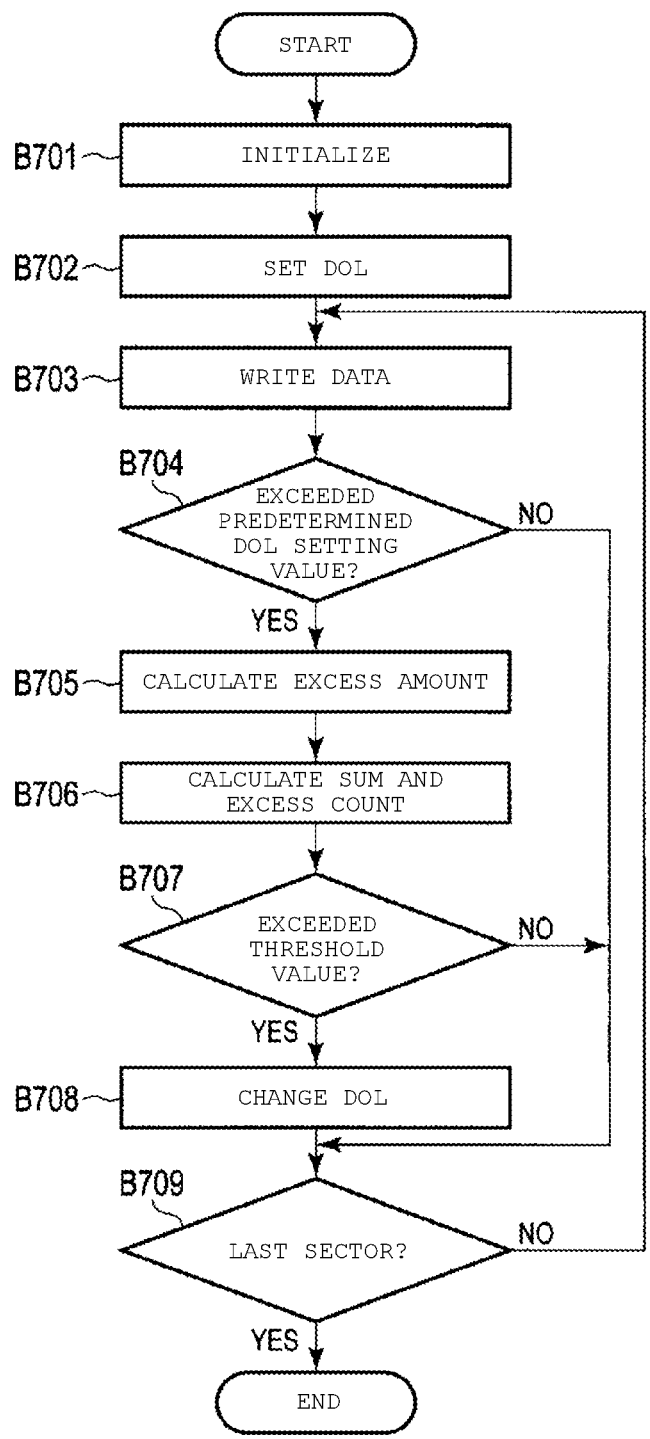
FIG. 7 is a flowchart showing a write processing method according to the first embodiment.

FIG. 7 is a flowchart showing a write processing method according to the present embodiment. In a case where the write processing of the predetermined track is started, the MPU 60 initializes the sum and the excess count corresponding to a previous track (B701). For example, the MPU 60 sets the sum and the excess count corresponding to the previous track to 0. The MPU 60 sets DOL (B702). For example, the MPU 60 generates a plurality of DOL setting values corresponding to the predetermined track based on a previous offset amount and the error correction indices and sets the maximum setting value among the plurality of DOL setting values to the DOL. The MPU 60 writes data in a predetermined sector of the predetermined track (B703) and determines whether or not the offset amount exceeds a predetermined DOL setting value (B704). For example, the MPU 60 determines whether or not the offset amount exceeds the minimum setting value. In a case where it is determined that the offset amount has not exceeded the predetermined DOL setting value (NO in B704), the MPU 60 proceeds to the processing of B709. In a case where it is determined that the offset amount has exceeded the predetermined DOL setting value (YES in B704), the MPU 60 calculates an excess amount (B705). The MPU 60 calculates the sum based on the excess amount and increments the excess count (B706). The MPU 60 determines whether or not at least one of the sum and the excess count exceeds the threshold value (i.e., the threshold value of the sum or threshold value the excess count) (B707). In a case where it is determined that at least one of the sum and the excess count has not exceeded the threshold value (NO in B707), the MPU 60 proceeds to the processing of B709. In a case where it is determined that at least one of the sum and the excess count has exceeded the threshold value (YES in B707), the MPU 60 changes the DOL (B708). For example, the MPU 60 changes DOL from the maximum setting value to the minimum setting value. The MPU 60 determines whether or not the sector is the last sector of the predetermined track (B709). In a case where it is determined that the sector is not the last sector (NO in B709), the MPU 60 proceeds to the processing of B702. In a case where it is determined that the sector is the last sector (YES in B709), the MPU 60 ends the processing.

According to the present embodiment, the magnetic disk device 1 sets one DOL setting value, for example, the maximum setting value among a plurality of DOL setting values corresponding to the current track, to DOL, based on the previous offset amount and the error correction indices. In the case where it is determined that there is a small possibility of correcting the read error data based on the parity data or the error correction code because at least one of the sum and the excess count exceeds the threshold value (i.e., the threshold value of the sum or threshold value of the excess count) or that the read error data cannot be corrected, the magnetic disk device 1 changes the DOL from the maximum setting value to a DOL setting value that is smaller than the maximum setting value, for example, the minimum setting value. That is, the magnetic disk device 1 may change the DOL while writing data on a predetermined track by DDOL. Therefore, the magnetic disk device 1 may improve the performance of the write processing. In addition, the magnetic disk device 1 may improve the performance of the read processing.

Next, a magnetic disk device according to a modification example will be described. In the modification example, the same reference numerals are given to the same parts as those of the above-described embodiment, and a detailed description thereof will be omitted.

Modification Example 1

The magnetic disk device 1 of Modification Example 1 is different from the magnetic disk device 1 of the first embodiment in the method of managing the DOL.

Figure 8:
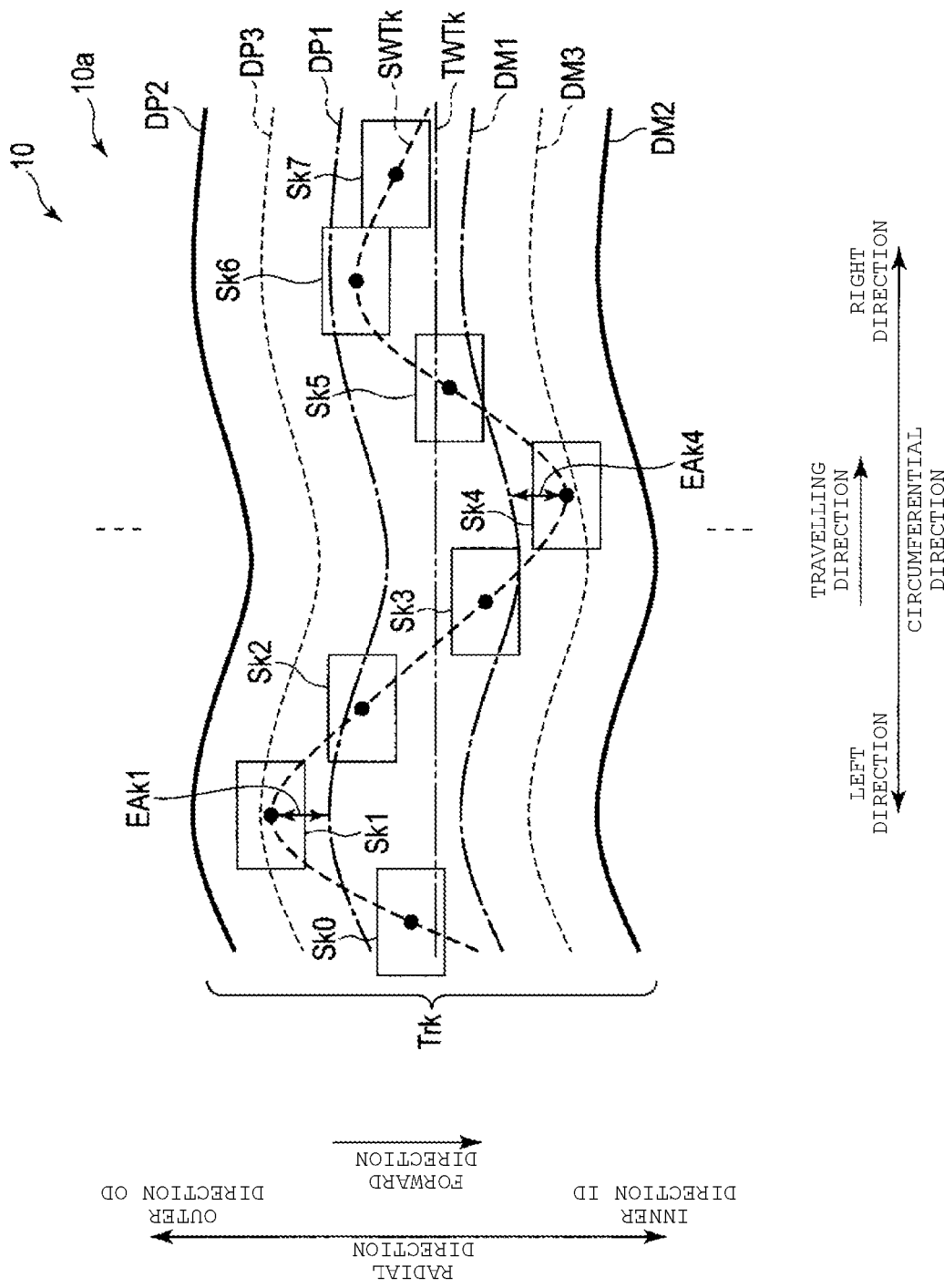
FIG. 8 is a schematic diagram showing a DOL management method according to Modification Example 1.

FIG. 8 is a schematic diagram showing a DOL management method according to Modification Example 1.

FIG. 8 shows DOL setting values DP3 and DM3. For example, in a case where the offset amount exceeds the maximum setting value DP2, or in a case where at least one of the sum and the excess count exceeds a predetermined value (i.e., a DOL change value of the sum and DOL change value of the excess count), the DOL setting values DP3 and DM3 are set as DOL. The DOL setting value DP3 is located in the outer direction with respect to the target path TWTk. Hereinafter, the DOP setting value DP3 is referred to as the outer DOL setting value DP3. The DOL setting value DM3 is located in the inner direction with respect to the target path TWTk. Hereinafter, the DOL setting value DM3 is referred to as inner DOL setting value DM3. Another DOL setting value may be set between the outer minimum setting value DP1 and the outer DOL setting value DP3, and another DOL setting value may be set between the outer maximum setting value DP2 and the outer DOL setting value DP3. In addition, another DOL setting value may be set between the inner minimum setting value DM1 and the inner DOL setting value DM3, and another DOL setting value may be set between the inner maximum setting value DM2 and the inner DOL setting value DM3.

As shown in FIG. 8, the outer DOL setting value DP3 and the inner DOL setting value DM3 have the same shape. The outer DOL setting value DP3 and the inner DOL setting value DM3 extend in the circumferential direction while being spaced at the same interval in the radial direction, for example. The outer minimum setting value DP1 and the outer DOL setting value DP3 extend in the circumferential direction while being spaced at the same interval in the radial direction, for example. The outer maximum setting value DP2 and the outer DOL setting value DP3 extend in the circumferential direction while being spaced at the same interval in the radial direction, for example. The inner minimum setting value DM1 and the inner DOL setting value DM3 extend in the circumferential direction while being spaced at the same interval in the radial direction, for example. The inner maximum setting value DM2 and the inner DOL setting value DM3 extend in the circumferential direction while being spaced at the same interval in the radial direction, for example. The outer DOL setting value DP3 and the inner DOL setting value DM3 extend in the circumferential direction while being spaced at different intervals in the radial direction, for example. The outer minimum setting value DP1 and the outer DOL setting value DP3 extend in the circumferential direction while being spaced at different intervals in the radial direction, for example. The outer maximum setting value DP2 and the outer DOL setting value DP3 extend in the circumferential direction while being spaced at different intervals in the radial direction, for example. The inner minimum setting value DM1 and the inner DOL setting value DM3 extend in the circumferential direction while being spaced at different intervals in the radial direction, for example. The inner maximum setting value DM2 and the inner DOL setting value DM3 extend in the circumferential direction while being spaced at different intervals in the radial direction, for example.

In a case where the write processing of the track Trk is started, the DOL management unit 64 initializes, for example, 0, the sum and the excess count corresponding to the previous track. In addition, the DOL management unit 64 changes the threshold value of the sum, the threshold value of the excess count, the DOL, and the like corresponding to the track before the track Trk to the threshold value of the sum, the threshold value of the excess count, the DOL, and the like corresponding to the track Trk. For example, the DOL management unit 64 sets the maximum setting values DP2 and DM2 to DOL based on the offset amount and the error correction indices of the track before the track Trk. When data is written in the sector Sk1, the DOL management unit 64 detects that the head 15 has exceeded the outer minimum setting value DP1 in the outer direction. In other words, the DOL management unit 64 detects that the offset amount exceeds the outer minimum setting value DP1 when data is written to the sector Sk1. In a case where it is detected that the offset amount exceeds the outer minimum setting value DP1 in the sector Sk1, the DOL management unit 64 acquires the excess amount EAk1 in the sector Sk1 and adds the excess amount EAk1 to the sum (0). In addition, in a case where it is detected that the offset amount exceeds the outer minimum setting value DP1, the DOL management unit 64 increments the excess count. The DOL management unit 64 determines whether or not the sum (i.e., the sum of the minimum excess amounts) exceeds the threshold value of the sum. In addition, the DOL management unit 64 determines whether or not the excess count (i.e., the number of times of exceeding the minimum) exceeds a threshold value of the excess amount. The DOL management unit 64 determines whether or not the sum exceeds the DOL change value of the sum. In addition, the DOL management unit 64 determines whether or not the excess count exceeds the DOL change value of the excess count. In a case where it is determined that at least one of the sum and the excess count has exceeded the threshold value (i.e., DOL change value of the sum and DOL change value of the excess count), the DOL management unit 64 changes DOL from the maximum setting values DP2 and DM2 to the DOL setting values DP3 and DM3. That is, in a case where it is determined that the sum has exceeded the DOL change value of the sum, the DOL management unit 64 changes DOL from the maximum setting values DP2 and DM2 to the DOL setting values DP3 and DM3. In a case where it is determined that the excess count has exceeded the DOL change value of the excess count, the DOL management unit 64 changes DOL from the maximum setting values DP2 and DM2 to the DOL setting values DP3 and DM3. In a case where it is determined that the sum has exceeded the DOL change value of the sum and the excess count has exceeded the DOL change value of the excess count, the DOL management unit 64 changes DOL from the maximum setting values DP2 and DM2 to the DOL setting values DP3 and DM3.

When the data is written in the sector Sk4, the DOL management unit 64 detects that the head 15 is displaced in the inner direction from the inner minimum setting value DM1. In other words, the DOL management unit 64 detects that the offset amount exceeds the inner minimum setting value DM1 when data is written to the sector Sk4. In a case where it is detected that the offset amount exceeds the inner minimum setting value DM1 in the sector Sk4, the DOL management unit 64 acquires the excess amount EAk4 in the sector Sk4 and adds the excess amount EAk4 to the sum (EAk1). In addition, in a case where it is detected that the offset amount exceeds the inner minimum setting value DM1, the DOL management unit 64 increments the excess count. The DOL management unit 64 determines whether or not the sum (EAk1+EAk4) exceeds the threshold value of the sum. In addition, the DOL management unit 64 determines whether or not the excess count exceeds the threshold value of the excess count. In a case where it is determined that at least one of the sum and the excess count has exceeded the threshold value (i.e., the threshold value of the sum or threshold value of the excess count), the DOL management unit 64 changes DOL from the maximum setting values DP3 and DM3 to the minimum setting values DP1 and DM1.

Figure 9:
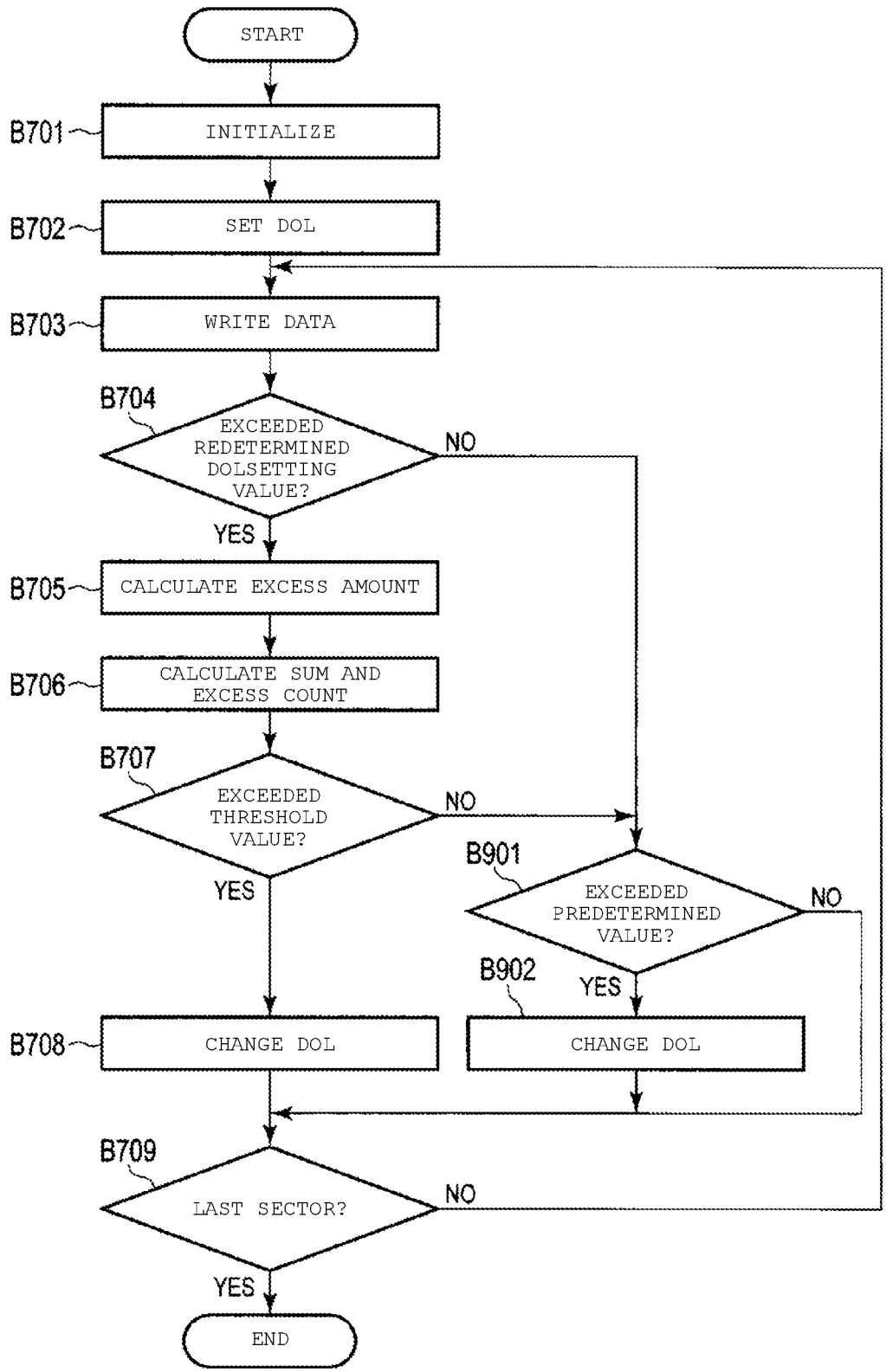
FIG. 9 is a flowchart showing a write processing method according to Modification Example 1.

FIG. 9 is a flowchart showing a write processing method according to Modification Example 1.

In a case where the write processing of the predetermined track is started, the MPU 60 initializes the sum and the excess count corresponding to the previous track (B701), sets the DOL (B702), writes the data in a predetermined sector of the predetermined track (B703), and determines whether or not the offset amount exceeds a predetermined DOL setting value (B704). In a case where it is determined that the offset amount has exceeded the predetermined DOL setting value (YES in B704), the MPU 60 calculates the excess amount (B705), calculates the sum based on the excess amount, and increments the excess count (B706). The MPU 60 determines whether or not at least one of the sum and the excess count exceeds the threshold value (threshold value of the sum or threshold value the excess count) (B707). In a case where it is determined that at least one of the sum and the excess count has not exceeded the threshold value (NO in B707), the MPU 60 determines whether or not at least one of the sum and the excess count exceeds a predetermined value (i.e., a DOL change value of the sum and DOL change value of the excess count) (B901). In a case where it is determined that at least one of the sum and the excess count has not exceeded a predetermined value (NO in B901), the MPU 60 proceeds to the processing of B709. In a case where it is determined that at least one of the sum and the excess count has exceeded the predetermined value (YES in B901), the MPU 60 changes the DOL (B902) and proceeds to the processing of B709. For example, the MPU 60 changes the DOL from the maximum setting value to the DOL setting value that is smaller than the maximum setting value and greater than the minimum setting value.

According to Modification Example 1, the magnetic disk device 1 decreases the DOL step by step each time at least one of the sum and the excess count exceeds a predetermined value (i.e., a DOL change value of the sum and DOL change value of the excess count). Therefore, the magnetic disk device 1 may improve the performance of the write processing and the read processing.

Modification Example 2

The magnetic disk device 1 of Modification Example 2 is different from the magnetic disk device 1 of the above-described embodiment and modification example in the method of managing the DOL.

For example, the MPU 60 separately manages a plurality of DOL setting values in the outer direction with respect to the target path (hereinafter, referred to as outer DOL setting values) and a plurality of DOL setting values in the inner direction with respect to the target path (hereinafter referred to as inner DOL setting values) in a predetermined track. In addition, the MPU 60 separately manages the index indicating the possibility of correcting the read error data (hereinafter, referred to as outer error correction index) based on the parity data and the error correction code in the current track (or the adjacent track on the outside of the current track) and the index indicating the possibility of correcting the read error data (hereinafter, referred to as inner error correction index) based on the parity data and the error correction code in the current track (or the adjacent track on the inside of the current track). Here, the outer error correction indices include the sum (hereinafter, simply referred to as outer sum) of the amounts by which the offset amount exceeds the outer DOL or one outer DOL setting value among the plurality of outer DOL setting values (hereinafter, referred to as outer excess amount), the number of times that the offset amount exceeds the outer DOL or one outer DOL setting value among the plurality of outer DOL setting values (hereinafter, referred to as outer excess count), and the like. The inner error correction indices include the sum (hereinafter, simply referred to as inner sum) of the amounts by which the offset amount exceeds the inner DOL or one inner DOL setting value among the plurality of inner DOL setting values (hereinafter, referred to as inner excess amount), the number of times that the offset amount exceeds the inner DOL or one inner DOL setting value among the plurality of inner DOL setting values (hereinafter, referred to as inner excess count), and the like.

In a case where data is written to the predetermined track, the MPU 60 generates a plurality of outer DOL setting values corresponding to the predetermined track based on the previous offset amount and the outer error correction indices. In the case of writing data to the predetermined track, the MPU 60 sets one outer DOL setting value among the plurality of outer DOL setting values corresponding to the predetermined track as the DOL in the outer direction with respect to the target path (hereinafter, referred to as outer DOL) based on the previous offset amount and the outer error correction indices. In a case where data is written on the predetermined track, the DOL management unit 64 changes the outer DOL based on the outer error correction indices. In a case where the offset amount has exceeded the outer DOL, the MPU 60 interrupts the write processing via the read/write control unit 61.

In a case where it is determined that the outer error correction indices, for example, the outer sum and the outer excess count are smaller than predetermined threshold values, the MPU 60 sets the outer DOL setting value having the largest absolute value among the plurality of outer DOL setting values (hereinafter, referred to as outer maximum setting value) corresponding to this track to the outer DOL. In other words, in a case where it is determined that the outer sum is smaller than a predetermined threshold value (hereinafter, referred to as threshold value of the outer sum) and the outer excess count is smaller than a predetermined threshold value (hereinafter, referred to as threshold value of the outer excess count), the MPU 60 sets the outer maximum setting value to the outer DOL.

In a case where it is determined that at least one of the outer error correction indices, for example, the outer sum and the outer excess count is greater than the predetermined threshold value, the MPU 60 changes the outer DOL from the outer maximum setting value to a predetermined outer DOL setting value whose absolute value is smaller than the outer maximum setting value among the plurality of outer DOL setting values corresponding to the predetermined track. In other words, in a case where it is determined that the outer sum is greater than the threshold value of the outer sum, the MPU 60 changes the outer DOL from the outer maximum setting value to the predetermined outer DOL setting value that is smaller than the outer maximum setting value. In a case where it is determined that the outer excess count is greater than the threshold value of the outer excess count, the MPU 60 changes the outer DOL from the outer maximum setting value to the predetermined outer DOL setting value that is smaller than the outer maximum setting value. In a case where it is determined that the outer sum is greater than the threshold value of the outer sum and the outer excess count is greater than the threshold value of the outer excess count, the MPU 60 changes the outer DOL from the outer maximum setting value to the predetermined outer DOL setting value that is smaller than the outer maximum setting value.

In one example, in a case where the outer sum of the amounts (hereinafter, referred to as sum of the outer minimum excess amounts) by which the predetermined offset amount exceeds the outer DOL setting value having the smallest absolute value among the plurality of outer DOL setting values (hereinafter, referred to as outer minimum setting value) and the outer excess count that the predetermined offset amount exceeds the outer minimum setting value (hereinafter, referred to as outer minimum excess count) are smaller than the predetermined threshold values in the predetermined track, the MPU 60 sets the DOL of this track to the outer maximum setting value. In other words, in a case where the sum of the outer minimum excess amounts is smaller than the threshold value of the outer sum and the outer excess count is smaller than the threshold value of the outer excess count in the predetermined track, the MPU 60 sets the outer DOL on this track to the outer maximum setting value. In addition, in a case where at least one of the sum of the outer minimum excess amounts and the outer minimum excess count in the predetermined track is greater than a predetermined threshold value, the MPU 60 changes the DOL corresponding to this track from the maximum setting value to the minimum setting value. In other words, in a case where the sum of the outer minimum excess amounts in the predetermined track is greater than the threshold value of the outer sum, the MPU 60 changes the DOL corresponding to this track from the outer maximum setting value to the outer minimum setting value. In a case where the outer minimum excess count is greater than the threshold value of the outer excess count in the predetermined track, the MPU 60 changes the DOL corresponding to this track from the outer maximum setting value to the outer minimum setting value. In a case where the sum of the outer minimum excess amounts is greater than the threshold value of the outer sum and the outer minimum excess count is greater than the threshold value of the outer excess count in the predetermined track, the MPU 60 changes the DOL corresponding to this track from the outer maximum setting value to the outer minimum setting value.

The MPU 60 may decrease the outer DOL step by step each time at least one of the outer sum and the outer excess count exceeds the predetermined value in the predetermined track. In other words, the MPU 60 decreases the outer DOL step by step each time the outer sum exceeds a predetermined value that is smaller than the threshold value of the outer sum (hereinafter, referred to as DOL change value of the outer sum) in the predetermined track. The DOL change value of the outer sum includes, for example, a plurality of values. In a case where the outer sum exceeds the threshold value of the outer sum, the MPU 60 sets the outer minimum setting value to the outer DOL. The MPU 60 decreases the outer DOL step by step each time the outer excess count exceeds a predetermined value (hereinafter, referred to as DOL change value of the outer excess count) that is smaller than the threshold value of the outer excess count in the predetermined track. The DOL change value of the outer excess count includes, for example, a plurality of values. In a case where the outer excess count exceeds the threshold value of the outer excess count, the MPU 60 sets the outer minimum setting value to the outer DOL. The MPU 60 decreases the outer DOL step by step each time the outer sum exceeds the DOL change value of the outer sum and the outer excess count exceeds the outer DOL change value of the outer excess count in the predetermined track.

In a case where data is written to the predetermined track, the MPU 60 generates a plurality of inner DOL setting values corresponding to the predetermined track based on the previous offset amount and the inner error correction indices. In the case of writing data to the predetermined track, the MPU 60 sets one inner DOL setting value among the plurality of inner DOL setting values corresponding to the predetermined track as the DOL in the inner direction with respect to the target path (hereinafter, referred to as inner DOL) based on the previous offset amount and the inner error correction indices. In a case where data is written to the predetermined track, the MPU 60 changes the inner DOL according to the inner error correction indices. In a case where the offset amount has exceeded the inner DOL, the MPU 60 interrupts the write processing via the read/write control unit 61.

In the case of writing data to the predetermined track, the MPU 60 sets the one inner DOL setting value among the plurality of inner DOL setting values corresponding to the current track to the inner DOL based on the previous offset amount and the inner error correction indices. In a case where it is determined that the inner error correction indices, for example, the inner sum and the inner excess count are smaller than predetermined threshold values, the MPU 60 sets the inner DOL setting value having the largest absolute value among the plurality of inner DOL setting values (hereinafter, referred to as inner maximum setting value) corresponding to this track to the inner DOL. In other words, in a case where it is determined that the inner sum is smaller than a predetermined threshold value (hereinafter, referred to as threshold value of the inner sum) and the inner excess count is smaller than a predetermined threshold value (hereinafter, referred to as threshold value of the inner excess count), the MPU 60 sets the inner maximum setting value to the inner DOL.

In a case where it is determined that at least one of the inner error correction indices, for example, the inner sum and the inner excess count is greater than the predetermined threshold value, the MPU 60 changes the inner DOL from the inner maximum setting value to a predetermined inner DOL setting value whose absolute value is smaller than the inner maximum setting value among the plurality of inner DOL setting values corresponding to the predetermined track. In other words, in a case where it is determined that the inner sum is greater than the threshold value of the inner outer sum, the MPU 60 changes the inner DOL from the inner maximum setting value to the predetermined inner DOL setting value that is smaller than the inner maximum setting value. In a case where it is determined that the inner excess count is greater than the threshold value of the inner excess count, the MPU 60 changes the inner DOL from the inner maximum setting value to the predetermined inner DOL setting value that is smaller than the inner maximum setting value. In a case where it is determined that the inner sum is greater than the threshold value of the inner sum and the inner excess count is greater than the threshold value of the inner excess count, the MPU 60 changes the inner DOL from the inner maximum setting value to the predetermined inner DOL setting value that is smaller than the inner maximum setting value.

In one example, in a case where the inner sum of the amounts (hereinafter, referred to as sum of the inner minimum excess amounts) by which the predetermined offset amount exceeds the inner DOL setting value having the smallest absolute value (hereinafter, referred to as inner minimum setting value) among the plurality of inner DOL setting values and the inner excess count that the predetermined offset amount exceeds the inner minimum setting value (hereinafter, referred to as inner minimum excess count) are smaller than the predetermined threshold values, the MPU 60 sets the DOL of this track to the inner maximum setting value. In other words, in a case where the sum of the inner minimum excess amounts is smaller than the threshold value of the inner sum and the outer excess count is smaller than the threshold value of the inner excess count in the predetermined track, the MPU 60 sets the inner DOL on this track to the inner maximum setting value. In addition, in a case where at least one of the sum of the inner minimum excess amounts and the inner minimum excess count in the predetermined track is greater than a predetermined threshold value, the MPU 60 changes the DOL corresponding to this track from the maximum setting value to the minimum setting value. In other words, in a case where the sum of the inner minimum excess amounts in the predetermined track is greater than the threshold value of the inner sum, the MPU 60 changes the DOL corresponding to this track from the outer maximum setting value to the outer minimum setting value. In a case where the inner minimum excess count is greater than the threshold value of the inner excess count in the predetermined track, the MPU 60 changes the DOL corresponding to this track from the inner maximum setting value to the inner minimum setting value. In a case where the sum of the inner minimum excess amounts is greater than the threshold value of the outer sum and the outer minimum excess count is greater than the threshold value of the outer excess count in the predetermined track, the MPU 60 changes the DOL corresponding to this track from the inner maximum setting value to the inner minimum setting value.

The MPU 60 may decrease the outer DOL step by step each time at least one of the inner sum and the inner excess count exceeds the predetermined value in the predetermined track. In other words, the MPU 60 decreases the inner DOL step by step each time the inner sum exceeds a predetermined value that is smaller than the threshold value of the inner sum (hereinafter, referred to as DOL change value of the inner sum) in the predetermined track. The DOL change value of the inner sum includes, for example, a plurality of values. In a case where the inner sum exceeds the threshold value of the inner sum, the MPU 60 sets the inner minimum setting value to the inner DOL. The MPU 60 decreases the inner DOL step by step each time the inner excess count exceeds a predetermined value (hereinafter, referred to as DOL change value of the inner excess count) that is smaller than the threshold value of the inner excess count in the predetermined track. The DOL change value of the inner excess count includes, for example, a plurality of values. In a case where the inner excess count exceeds the threshold value of the inner excess count, the MPU 60 sets the inner minimum setting value to the inner DOL. The MPU 60 decreases the inner DOL step by step each time the inner sum exceeds the DOL change value of the inner sum and the inner excess count exceeds the inner DOL change value of the inner excess count in the predetermined track.

Figure 10:
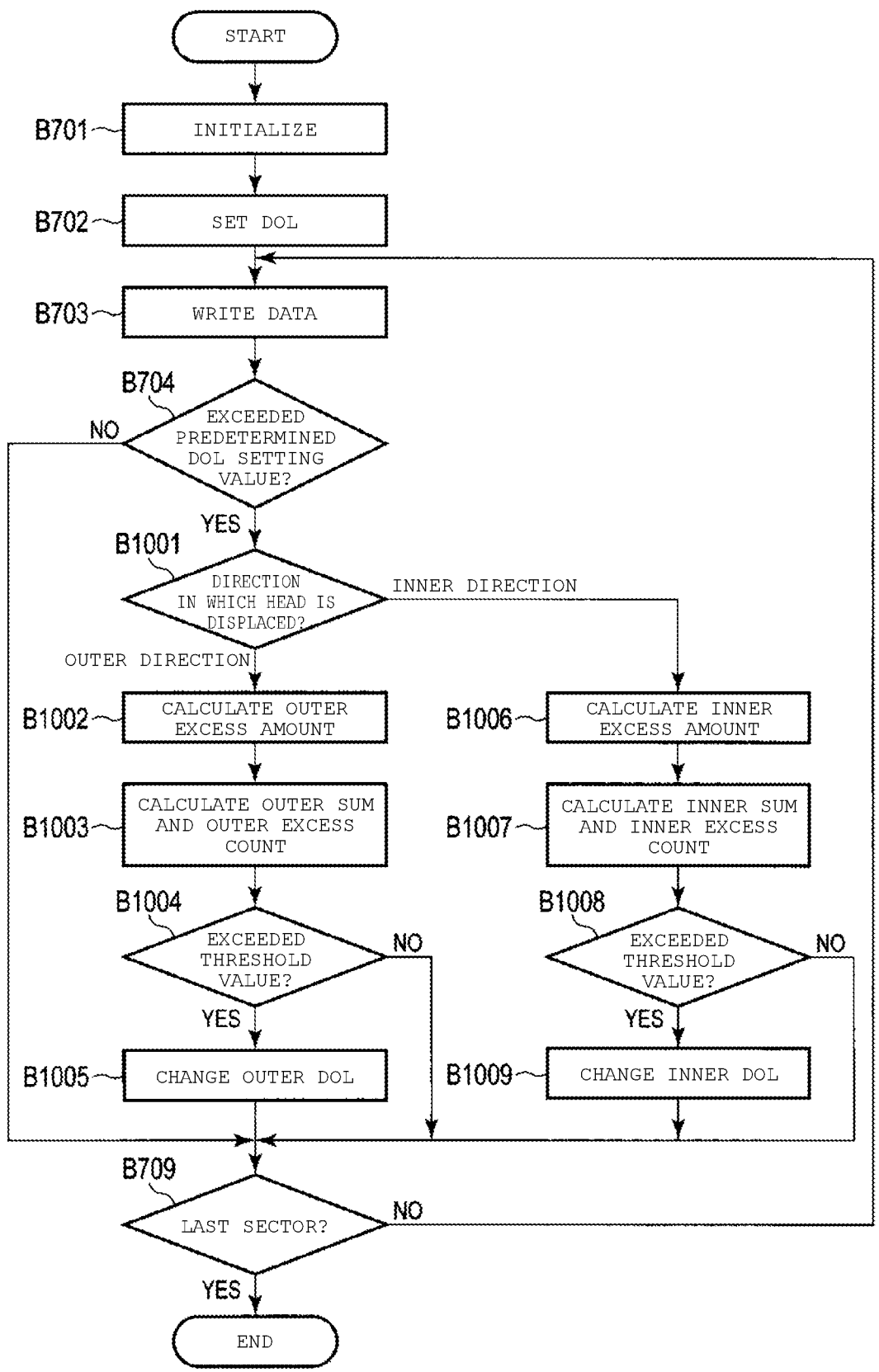
FIG. 10 is a flowchart showing a write processing method according to Modification Example 2.

FIG. 10 is a flowchart showing a write processing method according to Modification Example 2.

In a case where the write processing of the predetermined track is started, the MPU 60 initializes the sum and the excess count corresponding to the previous track (B701), sets the DOL (B702), writes the data in a predetermined sector of the predetermined track (B703), and determines whether or not the offset amount exceeds a predetermined DOL setting value (B704). In a case where it is determined that the offset amount has exceeded the predetermined DOL setting value (YES in B704), the MPU 60 determines the direction in which the head 15 is displaced (B1001). In a case where it is determined that the head 15 is displaced in the outer direction (outer direction of B1001), the MPU 60 calculates the outer excess amount (B1002), calculate the outer sum based on the outer excess amount, and increment the outer excess count (B1003). The MPU 60 determines whether or not at least one of the outer sum and the outer excess count exceeds the threshold value (i.e., the threshold value of the outer sum or threshold value of the outer excess count) (B1004). In a case where it is determined that at least one of the outer sum and the outer excess count has not exceeded the threshold value (NO in B1004), the MPU 60 proceeds to the processing of B709. In a case where it is determined that at least one of the outer sum and the outer excess count has exceeded the threshold value (YES in B1004), the MPU 60 changes the outer DOL (B1005) and proceeds to the processing of B709. For example, the MPU 60 changes the outer DOL from the outer maximum setting value to the outer minimum setting value. In a case where it is determined that the head 15 is displaced in the inner direction (inner direction of B1001), the MPU 60 calculates the inner excess amount (B1006), calculate the inner sum based on the inner excess amount, and increment the inner excess count (B1007). The MPU 60 determines whether or not at least one of the inner sum and the inner excess count exceeds a threshold value (i.e., a threshold value of the inner sum and threshold value of the inner excess amount) (B1008). In a case where it is determined that at least one of the inner sum and the inner excess count has not exceeded the threshold value (NO in B1008), the MPU 60 proceeds to the processing of B709. In a case where it is determined that at least one of the inner sum and the inner excess count has exceeded the threshold value (YES in B1008), the MPU 60 changes the inner DOL (B1009) and proceeds to the processing of B709. For example, the MPU 60 changes the inner DOL from the inner maximum setting value to the inner minimum setting value.

According to Modification Example 2, the magnetic disk device 1 separately manages the outer DOL and the inner DOL. The magnetic disk device 1 sets the outer maximum setting value to the outer DOL based on the previous offset amount and the outer error correction indices and sets the inner maximum setting value to the inner DOL based on the previous offset amount and the inner error correction indices. In the case where there is a small possibility of correcting the read error data based on the parity data or the error correction code because at least one of the outer sum and the outer excess count exceeds the threshold value (i.e., the threshold value of the outer sum or threshold value of the outer excess count) or that the read error data cannot be corrected, the magnetic disk device 1 changes the outer DOL from the outer maximum setting value to the outer minimum setting value. In the case where there is small possibility of correcting the read error data based on the parity data or the error correction code because at least one of the inner sum and the inner excess count exceeds the threshold value (i.e., the threshold value of the inner sum or threshold value of the inner excess count) or that the read error data cannot be corrected, the magnetic disk device 1 changes the inner DOL from the inner maximum setting value to the inner minimum setting value. Therefore, the magnetic disk device 1 may improve the performance of the write processing and the read processing.

Modification Example 3

The magnetic disk device 1 of Modification Example 3 is different from the magnetic disk device 1 of the above-described embodiment and modification example in the method of managing the DOL.

Figure 11:
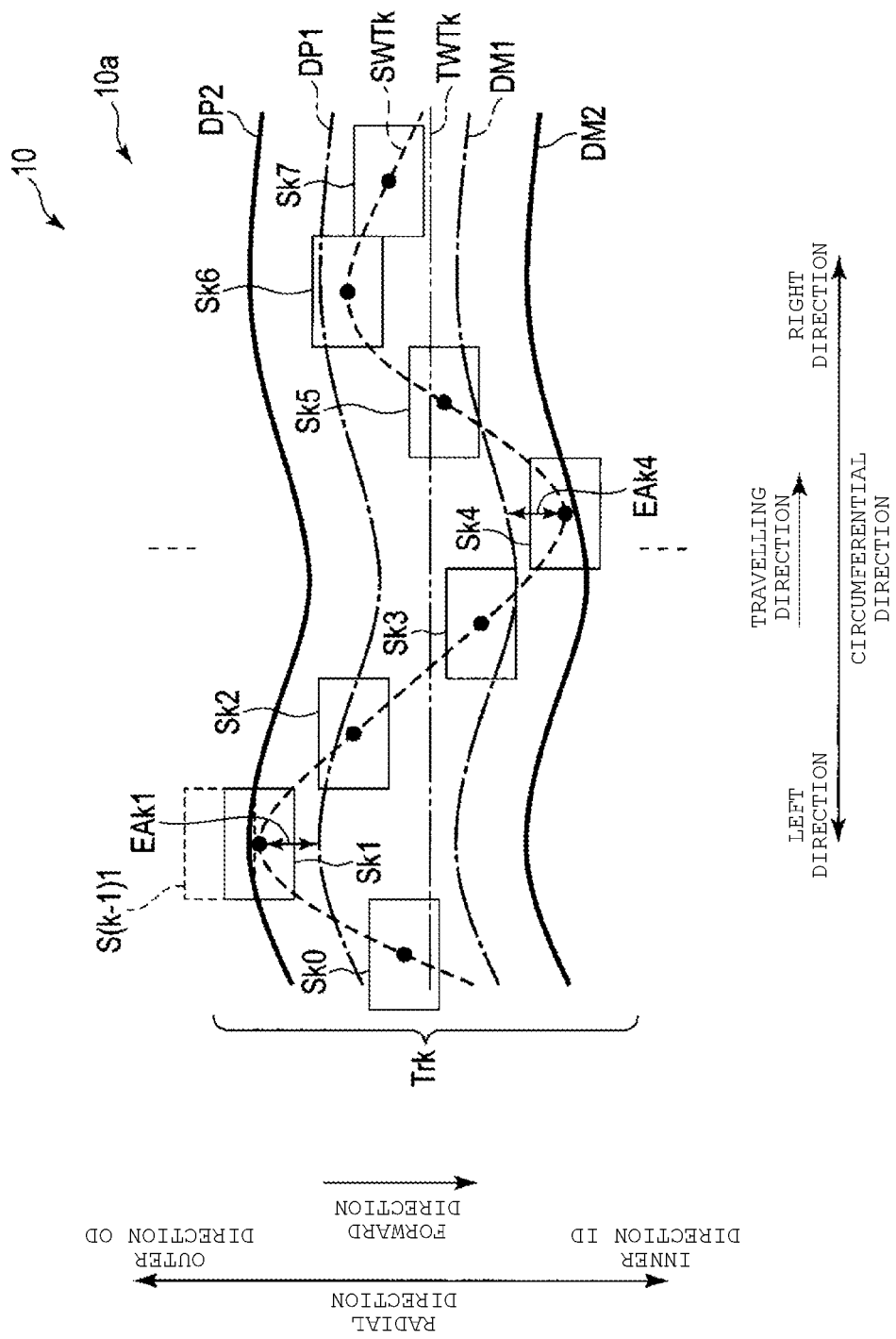
FIG. 11 is a schematic diagram showing a DOL management method according to Modification Example 3.

FIG. 11 is a schematic diagram showing a DOL management method according to Modification Example 3.

FIG. 11 shows a sector S(k−1) 1 adjacent to the sector Sk1 in the radial outer direction. For example, the sector S(k−1) 1 is registered in the list P including information related to bad sectors detected by inspection of defects on the disk 10 before shipment or the list G including information related to bad sectors detected after shipment as a bad sector including defects such as scratches.

When data is written in the sector Sk1, the MPU 60 detects that the head 15 is displaced in the outer direction from the outer minimum setting value DP1. In other words, the MPU 60 detects that the offset amount exceeds the outer minimum setting value DP1 when data is written to the sector Sk1. In a case where it is detected that the offset amount has exceeded the outer minimum setting value DP1 in the sector Sk1, the MPU 60 determines whether or not the sector S(k−1) 1 adjacent in the outer direction of the sector Sk1 is a bad sector. For example, the MPU 60 determines whether or not the sector S (k−1) 1 adjacent to the sector Sk1 in the outer direction is registered in at least one of a list P and a list G. In a case where it is determined that the sector S (k−1) 1 is a bad sector because the sector S(k−1) is registered in at least one of the list P and the list G, the MPU 60 executes the write processing without calculating the sum or the excess count. In other words, in a case where it is determined that the sector S(k−1) 1 is a bad sector because the sector S (k−1) is registered in at least one of the list P and the list G, the MPU 60 maintains the sum and the excess count. In a case where it is determined that the sector S (k−1) 1 is not a bad sector because the sector S (k−1) is not registered in the list P and the list G, the MPU 60 acquires the excess amount EAk1 in the sector Sk1 and adds the excess amount EAk1 to the sum (0). In addition, in a case where it is detected that the offset amount exceeds the outer minimum setting value DP1, the MPU 60 increments the excess count. The MPU 60 determines whether or not the sum exceeds the threshold value of the sum. In addition, the MPU 60 determines whether or not the excess count exceeds the threshold value of the excess amount.

Figure 12:
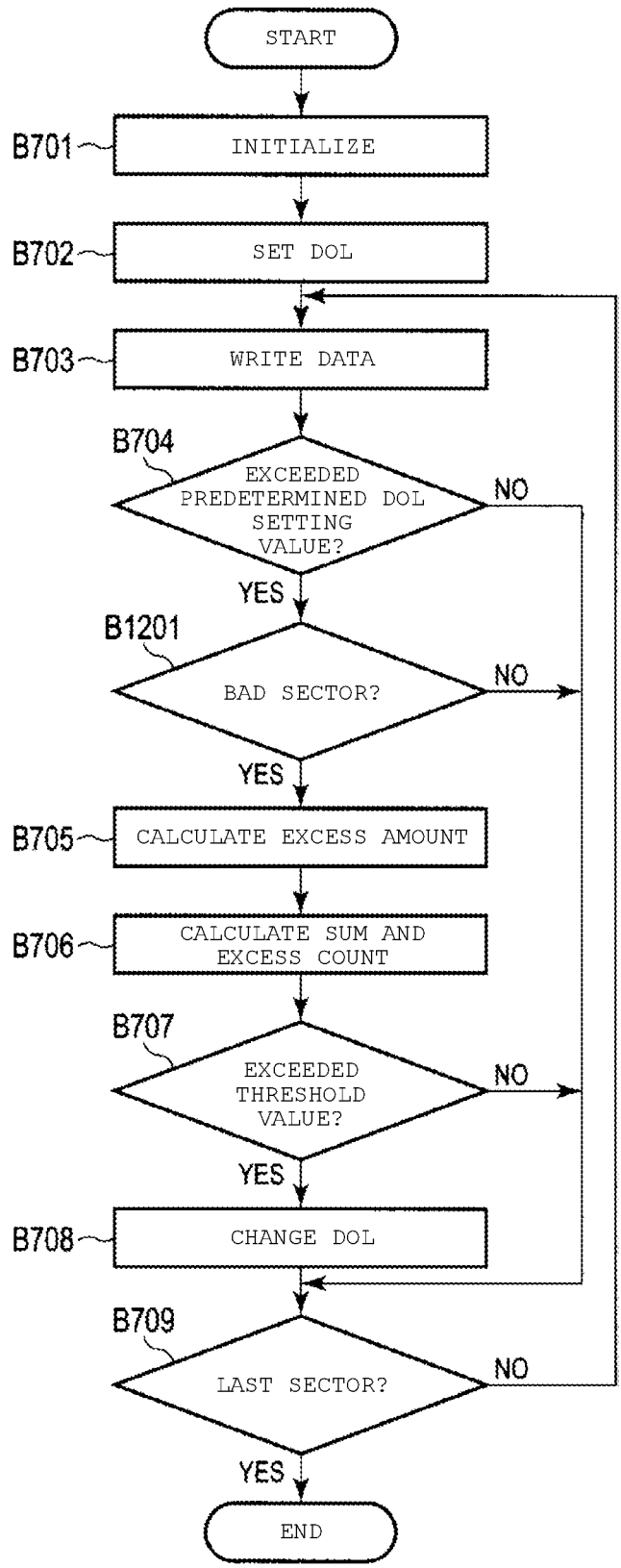
FIG. 12 is a flowchart showing a write processing method according to Modification Example 3.

FIG. 12 is a flowchart showing a write processing method according to Modification Example 3.

In a case where the write processing of the predetermined track is started, the MPU 60 initializes the sum and the excess count corresponding to the previous track (B701), sets the DOL (B702), writes the data in a predetermined sector of the predetermined track (B703), and determines whether or not the offset amount exceeds a predetermined DOL setting value (B704). In a case where it is determined that the offset amount has exceeded the predetermined DOL setting value (YES in B704), the MPU 60 determines whether or not the sector in which the head 15 is displaced is a bad sector (B1201). For example, the MPU 60 determines whether or not sectors adjacent in a direction in which the head 15 is displaced in the radial direction are registered in the list P or the list G. In a case where it is determined that the sector located in the direction in which the head 15 is displaced is not a bad sector (NO in B1201), the MPU 60 proceeds to the processing of B709. For example, since the sectors adjacent in the direction in which the head 15 is displaced in the radial direction are not registered in the list P and the list G, the MPU 60 determines that the sectors adjacent in the direction in which the head 15 is displaced in the radial direction are not bad sectors. In a case where it is determined that the sector located in the direction in which the head 15 is displaced is a bad sector (YES in B1201), the MPU 60 proceeds to the processing of B708. For example, since the sectors adjacent in the direction in which the head 15 is displaced in the radial direction are registered in at least one of the list P and the list G, the MPU 60 determines that the sectors adjacent in the direction in which the head 15 is displaced in the radial direction are bad sectors.

According to Modification Example 3, the magnetic disk device 1 determines whether or not the sector in which the head 15 is displaced is a bad sector. In a case where it is determined that the sector in which the head 15 is displaced is a bad sector, the magnetic disk device 1 executes the write processing without calculating the sum or the excess count. Therefore, the magnetic disk device 1 may improve the performance of the write processing and the read processing.

The configurations of the embodiment and the modification examples described above may be applied not only to the magnetic disk device 1 that writes data by shingled recording but also to a magnetic disk device that writes data by normal recording that is not shingled recording.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head for writing data to the disk and reading data from the disk; and
   a controller configured to
   detect a positioning error of the head as the head is writing the data in a first track of the disk, and
   change a first threshold value for interrupting the writing from a first value to a second value smaller than the first value based on one or more evaluation values corresponding to a possibility of correcting error data in the first track of the disk and including:
   a sum of amounts by which positioning errors exceed the second value, and
   a number of the positioning errors, wherein
   the controller interrupts the writing when detecting the positioning error of the head writing the first track that exceeds the first threshold value.

2. The magnetic disk device according to claim 1, wherein the controller changes the first threshold value in a case where the sum exceeds a second threshold value.

3. The magnetic disk device according to claim 1, wherein the controller changes the first threshold value in a case where the number of the positioning errors exceeds a third threshold value.

4. The magnetic disk device according to claim 1, wherein the controller maintains the sum and the number of the positioning errors in a case where the detected positioning error exceeds the second value and a first area adjacent to an area where the head is writing in a direction in which the head is displaced is a defective area that cannot be read.

5. The magnetic disk device according to claim 1, wherein the controller initializes the sum and the number of the positioning errors when writing a second track adjacent to the first track in a radial direction of the disk.

6. The magnetic disk device according to claim 5, wherein the controller overwrites the second track on a part of the first track.

7. The magnetic disk device according to claim 1, wherein the evaluation values further include:
   a first sum of amounts by which positioning errors in one of radial directions of the disk exceed a fourth value smaller than a third value,
   a second sum of amounts by which positioning errors in the other of the radial directions exceed, a sixth value smaller than a fifth value, and
   a number of positioning errors that exceed the first value.

8. The magnetic disk device according to claim 1, wherein the controller writes parity data corresponding to the first track on the first track and corrects error data based on the parity data.

9. A method performed by a magnetic disk device having a disk and a head for writing data to the disk and reading data from the disk, the method comprising:
   detecting a positioning error of the head as the head is writing the data in a first track of the disk;
   changing a first threshold value for interrupting the writing from a first value to a second value smaller than the first value based on one or more evaluation values corresponding to a possibility of correcting error data in the first track of the disk and including:
   a sum of amounts by which positioning errors exceed the second value, and
   a number of the positioning errors; and
   interrupting the writing when detecting the positioning error of the head writing the first track that exceeds the first threshold value.

10. The method according to claim 9, wherein the first threshold value is changed in a case where the sum exceeds a second threshold value.

11. The method according to claim 9, wherein the first threshold value is changed in a case where the number of the positioning errors exceeds a third threshold value.

12. The method according to claim 9, wherein the sum and the number of the positioning errors are maintained in a case where the detected positioning error exceeds the second value and a first area adjacent to an area where the head is writing in a direction in which the head is displaced is a defective area that cannot be read.

13. The method according to claim 9, further comprising:
   initializing the sum and the number of the positioning errors when writing a second track adjacent to the first track in a radial direction of the disk.

14. The method according to claim 13, wherein the second track is overwritten on a part of the first track.

15. The method according to claim 9, wherein the evaluation values further include:
   a first sum of amounts by which positioning errors in one of radial directions of the disk exceed a fourth value smaller than a third value,
   a second sum of amounts by which positioning errors in the other of the radial directions exceed a sixth fourth value smaller than a fifth value, and
   a number of positioning errors that exceed the first value.

16. A magnetic disk device comprising:
   a disk;
   a head for writing data to the disk and reading data from the disk;
   a memory that stores
   a first threshold value of a positioning error of the head for interrupting the writing and
   at least one of a sum of amounts by which positioning errors exceed a second threshold value and the number of the positioning errors; and
   a controller configured to
   control the head to write data in a track of the disk, detect a positioning error of the head as the head is writing the data in the track, based on the positioning error, update the one of the sum and the number of the positioning errors, and update the first threshold value according to the updated one of the sum and the number of the positioning errors.

\* \* \* \* \*